US012736986B2

(12) United States Patent
Park et al.

(10) Patent No.: US 12,736,986 B2
(45) Date of Patent: Sep. 15, 2026

(54) MOBILE ROBOT, DOCKING STATION, AND ROBOT SYSTEM INCLUDING SAME

(71) Applicant: LG ELECTRONICS INC., Seoul (KR)

(72) Inventors: Heegu Park, Seoul (KR); Dongseong Kim, Seoul (KR); Jaeheon Chung, Seoul (KR); Hyunsup Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 352 days.

(21) Appl. No.: 18/578,116

(22) PCT Filed: Jul. 21, 2021

(86) PCT No.: PCT/KR2021/009423

§ 371 (c)(1),
(2) Date: Jan. 10, 2024

(87) PCT Pub. No.: WO2023/286902

PCT Pub. Date: Jan. 19, 2023

(65) Prior Publication Data

US 2024/0377841 A1 Nov. 14, 2024

(30) Foreign Application Priority Data

Jul. 14, 2021 (KR) ........................ 10-2021-0092292

(51) Int. Cl.
*G05D 1/661* (2024.01)
*A47L 11/40* (2006.01)
*G05D 105/10* (2024.01)

(52) U.S. Cl.
CPC .......... *G05D 1/661* (2024.01); *A47L 11/4036* (2013.01); *A47L 11/4066* (2013.01);
(Continued)

(58) Field of Classification Search
CPC G05D 1/661; G05D 2105/10; A47L 11/4036; A47L 11/4066; A47L 2201/022; A47L 2201/024
See application file for complete search history.

(56) References Cited

U.S. PATENT DOCUMENTS

2013/0274920 A1* 10/2013 Abramson ........... A01D 34/008
700/250
2017/0055796 A1* 3/2017 Won .................... A47L 11/4069
(Continued)

FOREIGN PATENT DOCUMENTS

EP 1933467 6/2008
JP 2013-168150 8/2013
(Continued)

OTHER PUBLICATIONS

International Search Report dated Apr. 13, 2022 issued in Application No. PCT/KR2021/009423.
(Continued)

*Primary Examiner* — Marc Carlson
(74) *Attorney, Agent, or Firm* — KED & ASSOCIATES, LLP

(57) ABSTRACT

A robot system according to one aspect of the present disclosure comprises: a mobile robot traveling on the basis of power stored in a battery; and a docking station for charging the battery by supplying power through a charging cable, wherein each of the mobile robot and the docking station can include a power line communication unit for performing power line communication through the charging cable.

16 Claims, 20 Drawing Sheets

(52) U.S. Cl.
CPC ... *A47L 2201/022* (2013.01); *A47L 2201/024* (2013.01); *G05D 2105/10* (2024.01)

(56) References Cited

U.S. PATENT DOCUMENTS

| | | | | |
|---|---|---|---|---|
| 2017/0349057 A1* | 12/2017 | Namba | ................... | B60L 50/60 |
| 2018/0008111 A1* | 1/2018 | Morin | ................... | A47L 9/2857 |
| 2020/0153279 A1* | 5/2020 | Lee | ........................... | H02J 7/02 |
| 2023/0255418 A1* | 8/2023 | Choi | ..................... | A47L 9/1409<br>15/319 |

FOREIGN PATENT DOCUMENTS

| | | | |
|---|---|---|---|
| JP | 2019-217199 | 12/2019 | |
| JP | 2019-217206 | 12/2019 | |
| JP | 2019217206 A * | 12/2019 | .......... A47L 11/4091 |
| KR | 10-2017-0001345 | 1/2017 | |
| KR | 10-2020-0055367 | 5/2020 | |
| WO | WO 2016/113804 | 7/2016 | |

OTHER PUBLICATIONS

Extended European Search Report dated Jun. 24, 2025, on European Patent appl. No. 21950249.9.

* cited by examiner

100
V_BAT
150a
220
230
T1
T2
T3
C1
L
820
800
810
C2
C3
910
930
940
900
260
600
40
410
530
520
450a
920

40
1430a
PROCESSOR
530
POWER LINE COMMUNICATION UNIT
600
100
230
POWER LINE COMMUNICATION UNIT
150a
PROCESSOR
190
COMMUNICATION UNIT
2420
SERVER
2410
MOBILE TERMINAL

MOBILE ROBOT, DOCKING STATION, AND ROBOT SYSTEM INCLUDING SAME

CROSS-REFERENCE TO RELATED PATENT APPLICATIONS

This application is a U.S. National Stage Application under 35 U.S.C. § 371 of PCT Application No. PCT/KR2021/009423, filed Jul. 21, 2021, which claims priority to Korean Patent Application No. 10-2021-0092292, filed Jul. 14, 2021, whose entire disclosures are hereby incorporated by reference.

TECHNICAL FIELD

The present disclosure relates to a mobile robot, a docking station, and a robot system including the same, and more specifically, to a mobile robot and a docking station that communicate with each other.

BACKGROUND ART

Robots have been developed for industrial use and have been responsible for part of factory automation. Recently, the field of application of robots has further expanded, and thus medical robots, aerospace robots, and the like have been developed and household robots that can be used in general homes have also been produced. Among such robots, a robot that can travel by itself is called a mobile robot.

A mobile robot travels autonomously using power stored in a battery. The mobile robot can return to a docking station after traveling and charge the battery.

A representative example of a mobile robot used at home is a robot vacuum cleaner, which is a device that cleans a certain area by traveling by itself and sucking in surrounding dust or foreign substances.

The capacity of a dust bin for storing collected dust in a robot vacuum cleaner is small, and thus a user has the inconvenience of having to frequently empty the dust bin 140. In addition, at the time of emptying the dust bin 140, there is a problem that dust scatters and has a detrimental effect on the user's health. Additionally, if the remaining dust in the dust bin is not removed, there are problems that the suction power of the vacuum cleaner is reduced and a foul odor is generated due to the residue.

Accordingly, a docking station that includes a motor, a passage, a dust collection chamber, and the like which can suck dust collected in the dust bin of a robot vacuum cleaner when the robot vacuum cleaner is docked has been proposed.

For example, Prior Art Literature 1 (US Patent Publication No. 2017-0055796 (published on Mar. 2, 2017)) and Prior Art Literature 2 (US Patent Publication No. 2018-0008111 (published on Jan. 11, 2018)) disclose a station that stores dust in the main body of a vacuum cleaner and transmits information such as the amount of stored dust through a wireless communication means.

A robot vacuum cleaner needs to perform various types of data communication with a station having a dust collection device in order to provide customer convenience. Recently, as various convenience functions have been added to vacuum cleaners, it is necessary to implement communication for delivering various functions and various types of information, such as station dust emptying notification, robot dust emptying notification, and station operation status to customers. However, conventional device-to-device communication is performed by installing a separate RF communication module or IR transceiver. Accordingly, material costs increase and there are limitations in providing customer value through vacuum cleaner products with various functions.

Disclosure

Technical Problem

An object of the present disclosure is to solve the above-described problems and other problems.

An object of the present disclosure is to provide a mobile robot and a docking station capable of bidirectional communication using power line communication.

An object of the present disclosure is to provide a mobile robot, a docking station, and a robot system including the same which can provide various services related to the mobile robot by communicating with the mobile robot docked with the docking station.

An object of the present disclosure is to provide a mobile robot, a docking station, and a robot system including the same which can provide information related to the mobile robot and the docking station to a user through the mobile robot.

An object of the present disclosure is to provide a mobile robot, a docking station, and a robot system including the same which can perform stable communication at low cost.

The objects of the present disclosure are not limited to the objects mentioned above, and other objects and advantages of the present disclosure that are not mentioned can be understood through the detailed description according to the embodiments of the present disclosure.

Technical Solution

In order to achieve the above or other objects, a mobile robot, a docking station, and a robot system including the same according to an aspect of the present disclosure can perform bidirectional communication using power line communication and provide various services.

In order to achieve the above or other objects, a mobile robot according to an aspect of the present disclosure may include a main body in which a battery is accommodated, a traveling unit configured to move the main body to a station for charging the battery, and a power supply unit including a charging unit configured to receive power from the station through a charging cable to charge the battery, and a power line communication unit configured to perform power line communication with the station through the charging cable.

The power line communication unit may include a mixer configured to mix a serial communication signal with a carrier signal to generate an on-off keying (OOK) modulated transmission signal, and a transmission unit including a capacitor disposed between the mixer and the charging cable.

The mixer may include a three-state buffer, and the transmission signal generated by the mixer may be output in a high impedance (High-Z) state when the serial communication signal is high, and the carrier signal may be output only when the serial communication signal is low.

In order to achieve the above or other objects, the mobile robot according to an aspect of the present disclosure may further include a processor configured to generate the carrier signal and the serial communication signal and having a first terminal through which the carrier signal is output and a second terminal through which the serial communication signal is output, the first terminal and the second terminal being connected to the mixer.

The power line communication unit may include an operational amplifier (OP-AMP) connected to a third terminal of the processor, an RC filter connected to a first terminal of the operational amplifier, an envelope detection unit connected to a second terminal of the operational amplifier, and a reception unit including a capacitor connected to the RC filter and the envelope detection unit.

The RC filter may output a moving average value based on a received signal, the envelope detection unit may detect an envelope in the received signal and outputs an envelope detection signal, and the operational amplifier may compare the moving average value and the envelope detection signal and output an inverted signal.

The power line communication unit may include a reception unit configured to demodulate an on-off keying (OOK) modulated received signal.

The charging unit may include an LC filter disposed at the front of the battery.

In order to achieve the above or other objects, a docking station according to an aspect of the present disclosure may include a charging terminal electrically connected to a terminal of a mobile robot, a charging unit configured to supply power for charging a battery of the mobile robot through a charging cable, and a power line communication unit configured to perform power line communication with the mobile robot through the charging cable.

In order to achieve the above or other objects, a docking station according to an aspect of the present disclosure may include a suction unit including a dust collection chamber for receiving dust and a suction motor for sucking dust in a dust bin of the mobile robot into the dust collection chamber, and a sensor unit including a sensor for detecting the amount of dust collected in the dust collection chamber, wherein the docking station may transmit dust collection chamber emptying notification information to the mobile robot through the power line communication unit on the basis of data detected by the sensor.

The power line communication unit may include a mixer configured to mix a serial communication signal with a carrier signal to generate an on-off keying (OOK) modulated transmission signal, and a transmission unit including a capacitor disposed between the mixer and the charging cable.

The mixer may include a three-state buffer, and the transmission signal generated by the mixer may be output in a high impedance (High-Z) state when the serial communication signal is high, and the carrier signal may be output only when the serial communication signal is low.

In order to achieve the above or other objects, the docking station according to an aspect of the present disclosure may further include a processor configured to generate the carrier signal and the serial communication signal and having a first terminal through which the carrier signal is output and a second terminal through which the serial communication signal is output, the first terminal and the second terminal being connected to the mixer.

The power line communication unit may include an operational amplifier (OP-AMP) connected to a third terminal of the processor, an RC filter connected to a first terminal of the operational amplifier, an envelope detection unit connected to a second terminal of the operational amplifier, and a reception unit including a capacitor connected to the RC filter and the envelope detection unit.

The operational amplifier may compare a moving average value output from the RC filter with an envelope detection signal output from the envelope detection unit and output an inverted signal.

The power line communication unit may include a reception unit configured to demodulate an on-off keying (OOF) modulated received signal.

In order to achieve the above or other objects, the docking station according to an aspect of the present disclosure may further include a power transform unit configured to transform commercial power into charging power for the battery, wherein the charging unit may include an LC filter disposed between the charging cable and the power transform unit.

In order to achieve the above or other objects, a robot system according to an aspect of the present disclosure may include a mobile robot configured to travel on the basis of power stored in a battery, and a docking station configured to supply power through a charging cable to charge the battery, wherein the mobile robot and the docking station each may include a power line communication unit configured to perform power line communication through the charging cable.

The docking station may transmit dust collection chamber emptying notification information to the mobile robot through power line communication, and the mobile robot may transmit the dust collection chamber emptying notification information to a predetermined server or a predetermined mobile terminal.

The power line communication unit may include a transmission unit including a mixer configured to mix a serial communication signal with a carrier signal to generate an on-off keying (OOK) modulated transmission signal, and a capacitor disposed between the mixer and the charging cable, and a reception unit including an operational amplifier (OP-AMP), an RC filter connected to a first terminal of the operational amplifier, an envelope detection unit connected to a second terminal of the operational amplifier, and a capacitor connected to the RC filter and the envelope detection unit.

Advantageous Effects

According to at least one of the embodiments of the present disclosure, a mobile robot and a docking station are capable of bidirectional communication using power line communication. Accordingly, it is possible to provide various services to customers.

In addition, according to at least one of the embodiments of the present disclosure, it is possible to provide a mobile robot, a docking station, and a robot system including the same which can provide various services related to the mobile robot by communicating with the mobile robot docked with the docking state.

Additionally, according to at least one of the embodiments of the present disclosure, it is possible to provide information related to the mobile robot and the docking station to a user through the mobile robot.

Additionally, according to at least one of the embodiments of the present disclosure, it is possible to realize stable communication structure at low cost.

BEST MODE

Figure 1:
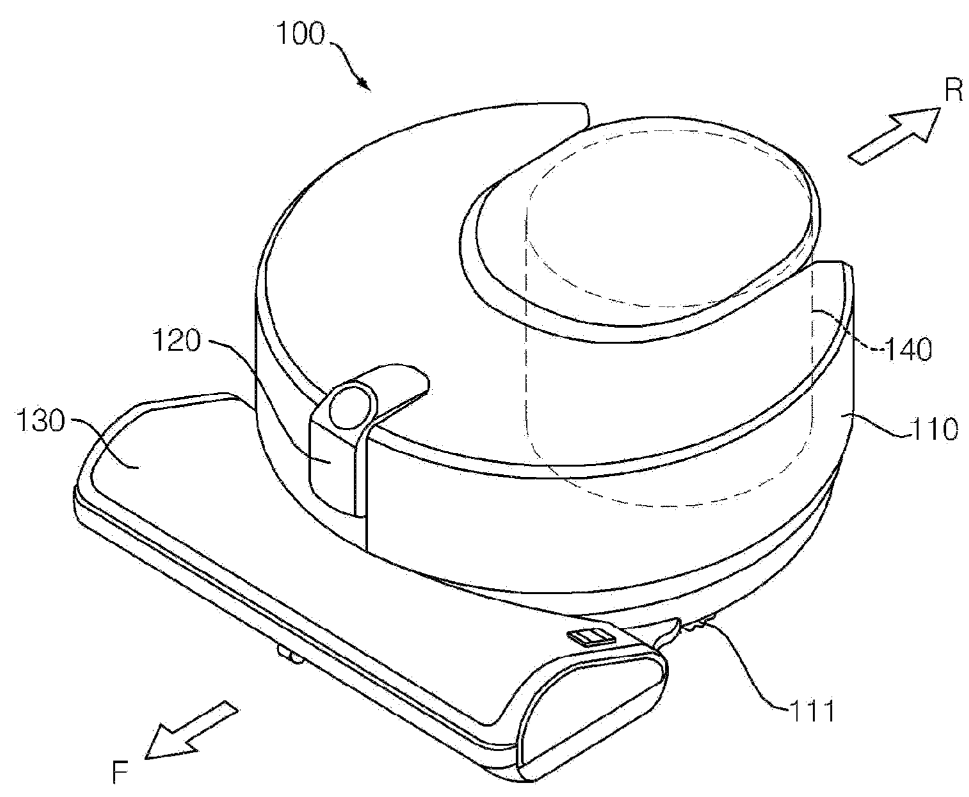
FIG. 1 is a perspective view showing a mobile robot according to an embodiment of the present disclosure.

Hereinafter, embodiments of the present disclosure will be described in detail with reference to the attached drawings. However, the present disclosure is not limited to these embodiments and can be modified into various forms.

In the drawings, parts not related to description are omitted in order to clearly and briefly describe the present disclosure, and identical or extremely similar parts are denoted by the same reference numerals throughout the specification.

Meanwhile, the suffixes “module” and “part” for components used in the following description are simply given in consideration of the ease of writing this specification and do not give any particularly important meaning or role. Accordingly, the terms “module” and “unit” may be used interchangeably.

Additionally, in this specification, terms such as “first” and “second” may be used to describe various elements, but these elements are not limited by these terms. Such terms are used only to distinguish one element from another.

A control configuration of the present disclosure may include at least one processor.

Figure 2:
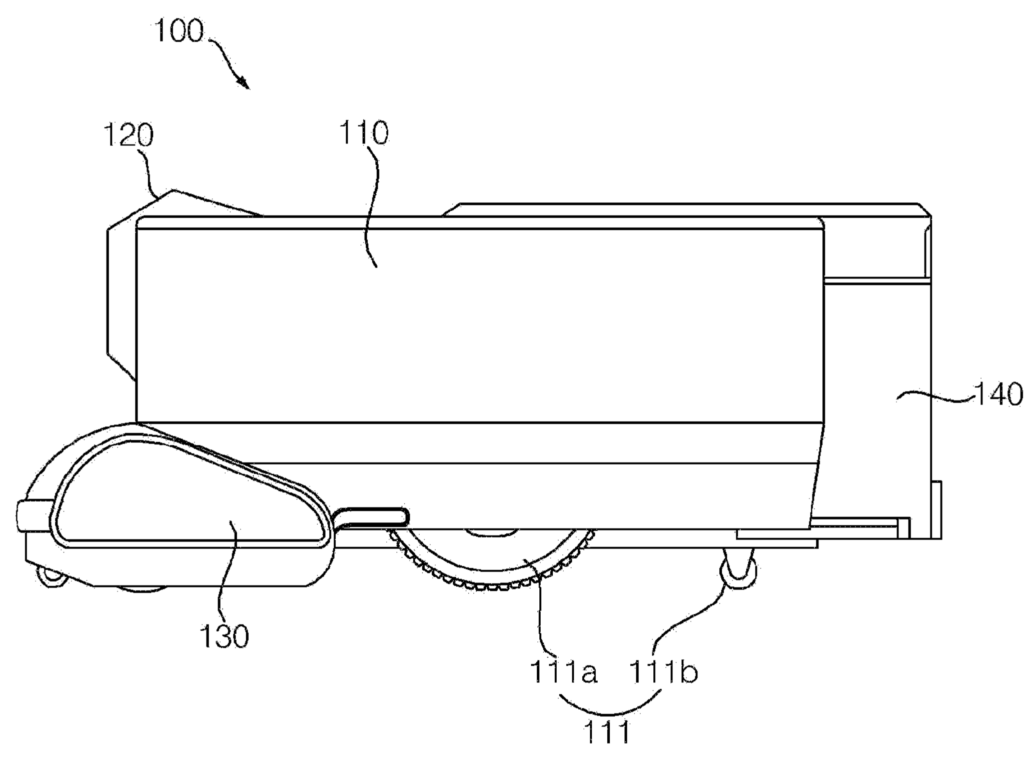
FIG. 2 is a side view of the mobile robot of FIG. 1.

FIG. 1 is a perspective view showing a mobile robot according to an embodiment of the present disclosure, and FIG. 2 is a side view of the mobile robot of FIG. 1.

Referring to FIGS. 1 and 2, the mobile robot 100 can travel a certain area autonomously. The mobile robot 100 can perform a function of cleaning the floor. Floor cleaning mentioned here includes sucking in dust (including foreign substances) from the floor or mopping the floor.

The mobile robot 100 includes a main body 110. The main body 110 includes a cabinet that forms the exterior. The mobile robot 100 may include a cleaning unit 130 and a dust bin 140 provided in the main body 110. The mobile robot 100 includes an image acquisition unit 120 that detects information related to the environment around the mobile robot. The mobile robot 100 includes a traveling unit 160 that moves the main body. The mobile robot 100 includes a control unit 150 for controlling the mobile robot 100. The control unit 150 is provided in the main body 110.

The traveling unit 160 includes a wheel unit 111 for traveling of the mobile robot 100. The wheel unit 111 is provided in the main body 110. The mobile robot 100 can move forward, left, right, or rotate by the wheel unit 111. As the control unit controls driving of the wheel unit 111, the mobile robot 100 can autonomously travel on the floor. The wheel unit 111 includes main wheels 111*a* and a sub wheel 111*b*.

The main wheels 111*a* are provided on both sides of the main body 110 and configured to be able to rotate in one direction or the other direction according to a control signal from the control unit. The main wheels 111*a* may be configured to be driven independently of each other. For example, the main wheels 111*a* may be driven by different motors.

The sub wheel 111*b* supports the main body 110 together with the main wheels 111*a* and assists traveling of the mobile robot 100 by the main wheels 111*a*. The sub-wheel 111*b* may also be provided in a cleaning unit 130 which will be described later.

The cleaning unit 130 may be disposed to protrude from the front F of the main body 110. The cleaning unit 130 may be provided to suck air containing dust.

The cleaning unit 130 may have a shape that protrudes from the front of the main body 110 to both left and right sides. The front end of the cleaning unit 130 may be disposed at a position spaced forward from one side of the main body 110. Both the left and right ends of the cleaning unit 130 may be disposed at positions spaced apart from the main body 110 on both the left and right sides.

The main body 110 is formed in a circular shape, and as both sides of the rear end of the cleaning unit 130 protrude from the main body 110 to the left and right, an empty space, that is, a gap, may be formed between the main body 110 and the cleaning unit 130. The empty space is a space between the left and right ends of the main body 110 and the left and right ends of the cleaning unit 130 and has a shape recessed into the inside of the mobile robot 100.

The cleaning unit 130 may be detachably coupled to the main body 110. When the cleaning unit 130 is separated from the main body 110, a mop module (not shown) may be detachably coupled to the main body 110 to replace the separated cleaning unit 130.

The image acquisition unit 120 may be disposed in the main body 110. The image acquisition unit 120 may be disposed in the front F of the main body 110. The image acquisition unit 120 may be disposed to overlap the cleaning unit 130 in the vertical direction of the main body 110. The image acquisition unit 120 may be disposed at the top of the cleaning unit 130.

The image acquisition unit 120 can detect obstacles around the mobile robot 100. The image acquisition unit 120 can detect obstacles or features in front such that the cleaning unit 130 located at the front of the mobile robot 100 does not collide with obstacles. In addition to this detection function, the image acquisition unit 120 may additionally perform other sensing functions which will be described later.

The main body 110 may be provided with a dust bin container (not shown). The dust bin 140 that separates and collects dust from the sucked air is detachably coupled to the dust bin container. The dust bin container may be formed at the rear R of the main body 110. A part of the dust bin 140 may be accommodated in the dust bin container, and the other part of the dust bin 140 may be formed to protrude to the rear R of the main body 110.

An inlet (not shown) through which air containing dust flows in and an outlet (not shown) through which air from which dust has been separated is discharged are formed in the dust bin 140. The inlet and the outlet of the dust bin 140 are formed to communicate with a first opening (not shown) and a second opening (not shown) formed on the inner wall of the dust bin container when the dust bin 140 is set in the dust bin container.

A suction passage (not shown) is provided to guide air from a suction port of the cleaning unit 130 to the first opening. An exhaust passage (not shown) is provided to guide air from the second opening to an exhaust port (not shown) open to the outside.

Air containing dust introduced through the cleaning unit 130 passes through the suction passage inside the main body 110, flows into the dust bin 140, and is separated from the dust while passing through a filter or cyclone of the dust bin 140. The dust is collected in the dust bin 140, and the air is discharged from the dust bin 140, passes through the exhaust passage inside the main body 110, and is finally discharged to the outside through the exhaust port.

Figure 3:
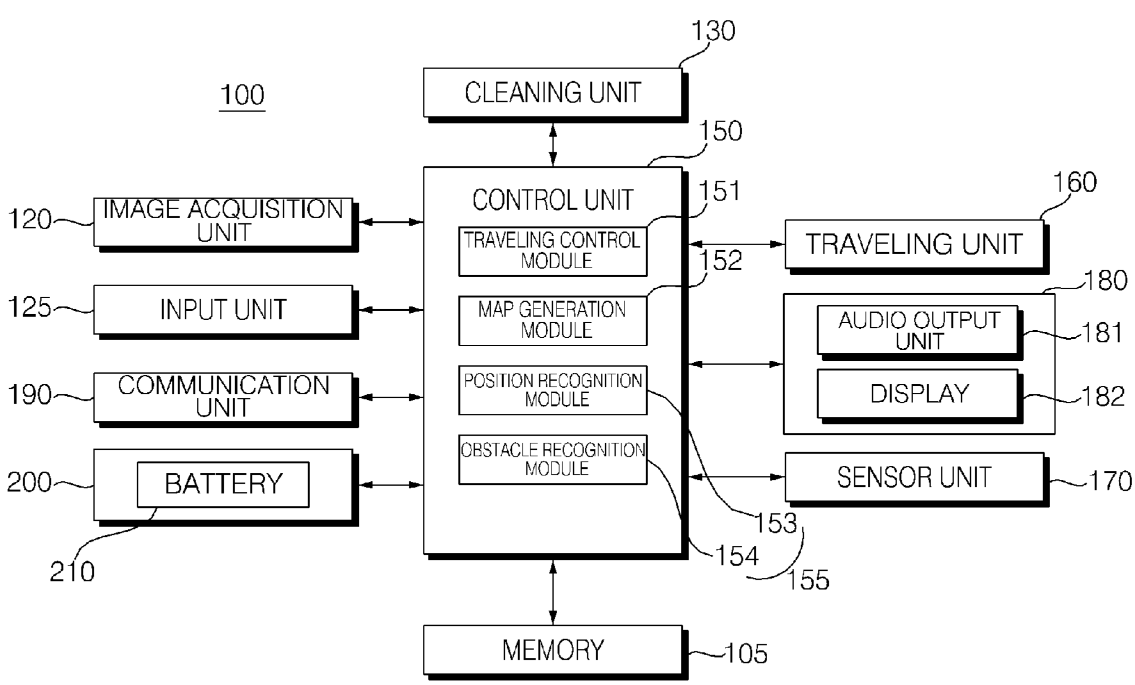
FIG. 3 is a block diagram showing a control relationship between major components of the mobile robot according to an embodiment of the present disclosure.

FIG. 3 is a block diagram showing a control relationship between main components of the mobile robot according to an embodiment of the present disclosure.

Referring to FIGS. 1 to 3, the mobile robot 100 includes the main body 110 and the image acquisition unit 120 that acquires images around the main body 110.

The mobile robot 100 includes the traveling unit 160 that moves the main body 110. The traveling unit 160 includes at least one wheel unit 111 that moves the main body 110. The traveling unit 160 includes a driving motor (not shown) that is connected to the wheel unit 111 to rotate the wheel unit 111.

The image acquisition unit 120 captures an image of a traveling area and may include a camera module. The camera module may include a digital camera. A digital camera may include an image sensor (e.g., a CMOS image sensor) that includes at least one optical lens and a plurality of photodiodes (e.g., pixels) that form an image by light passing through the optical lens, and a digital signal processor (DSP) that constructs an image based on signals output from the photodiodes. The digital signal processor can generate not only still images but also moving images composed of frames composed of still images.

Multiple cameras may be installed in each area for image-capturing efficiency. Images captured by the camera can be used to recognize the type of material such as dust, hair, and floor present in the corresponding space and to determine whether cleaning has been performed or a cleaning time.

The camera can capture situations of obstacles or cleaning areas in front of the mobile robot 100 in the traveling direction.

According to an embodiment of the present disclosure, the image acquisition unit 120 may acquire a plurality of images by continuously capturing the surroundings of the main body 110, and the plurality of acquired images may be stored in a memory 105.

The mobile robot 100 can improve the accuracy of spatial recognition, position recognition, and obstacle recognition by using the plurality of images, or select one or more images from the plurality of images and use effective data to improve the accuracy of spatial recognition, position recognition, and obstacle recognition.

Additionally, the mobile robot 100 may include a sensor unit 170 that includes sensors for sensing various types of data related to the operation and state of the mobile robot 100.

For example, the sensor unit 170 may include an obstacle detection sensor that detects an obstacle in front. Additionally, the sensor unit 170 may further include a cliff detection sensor that detects presence of a cliff on the floor within the traveling area and a bottom camera sensor that acquires an image of the floor.

The obstacle detection sensor may include an infrared sensor, an ultrasonic sensor, an RF sensor, a geomagnetic sensor, a position sensitive device (PSD) sensor, etc.

Meanwhile, the positions and types of sensors included in the obstacle detection sensor may depend on the type of the mobile robot, and the obstacle detection sensor may include more diverse sensors.

Meanwhile, the sensor unit 170 may further include a motion detection sensor that detects the motion of the mobile robot 100 according to driving of the main body 110 and outputs motion information. For example, a gyro sensor, a wheel sensor, an acceleration sensor, and the like may be used as a motion detection sensor.

The gyro sensor detects a rotation direction and a rotation angle when the mobile robot 100 moves in a driving mode. The gyro sensor detects the angular velocity of the mobile robot 100 and outputs a voltage value proportional to the angular velocity. The control unit 150 calculates a rotation direction and a rotation angle using the voltage value output from the gyro sensor.

The wheel sensor is connected to the wheel unit 111 and detects the rotation speed of the wheel. Here, the wheel sensor may be a rotary encoder.

The acceleration sensor detects changes in the speed of the mobile robot 100, for example, changes in the mobile robot 100 due to starting, stopping, changing directions, and colliding with an object.

Additionally, the acceleration sensor may be built into the control unit 150 and can detect changes in the speed of the mobile robot 100.

The control unit 150 may calculate a change in the position of the mobile robot 100 on the basis of motion information output from the motion detection sensor. This position is a relative position corresponding to an absolute position using image information. The mobile robot 100 can improve the performance of position recognition using image information and obstacle information through such relative position recognition.

Meanwhile, the mobile robot 100 may include a power supply unit 200 that has a rechargeable battery 210 and supplies power to the mobile robot.

The power supply unit 200 supplies driving power and operating power to each component of the mobile robot 100, and when the remaining power is insufficient, can be charged by receiving power from a docking station 40.

The mobile robot 100 may further include a battery detection unit (not shown) that detects a charging state of the battery 210 and transmits the detection result to the control unit 150. The battery 210 is connected to the battery detection unit and the remaining battery capacity and charging state are transmitted to the control unit 150. The remaining battery capacity may be displayed on a display 182 of an output unit 180.

Additionally, the mobile robot 100 includes an input unit 125 through which on/off or various commands can be input. The input unit 125 may include buttons, dials, a touchscreen, and the like. The input unit 125 may include a microphone for receiving voice instructions from a user. Various control commands necessary for the overall operation of the mobile robot 100 can be input through the input unit 125.

Additionally, the mobile robot 100 includes the output unit 180 which can display reservation information, a battery status, an operation mode, an operation status, an error status, and the like as images or output the same as sound.

The output unit 180 may include an audio output unit 181 that outputs an audio signal. The audio output unit 181 may output warning sound, notification messages such as an operation mode, an operation status, and an error status, and the like through sound under the control of the control unit 150. The audio output unit 181 can convert an electrical signal from the control unit 150 into an audio signal and output the audio signal. To this end, a speaker and the like may be provided.

In addition, the output unit 180 may further include the display 182 that displays reservation information, a battery status, an operation mode, an operation status, an error status, and the like as images.

Referring to FIG. 3, the mobile robot 100 includes the control unit 150 that processes and determines various types of information such as recognizing the current position, and the memory 105 that stores various types of data. Additionally, the mobile robot 100 may further include a communication unit 190 that transmits/receives data to/from an external terminal.

The external terminal may include an application for controlling the mobile robot 100, display a map of traveling areas to be cleaned by the mobile robot 100 through execution of the application, and designate a specific area which will be cleaned on the map. Examples of the external terminal include a remote controller, a PDA, a laptop computer, a smartphone, and a tablet in which an application for map settings is installed.

The external terminal can communicate with the mobile robot 100 and display the current position of the mobile robot along with the map, and may display information on a plurality of areas. Additionally, the external terminal updates and displays the position of the mobile robot as the mobile robot travels.

The control unit 150 controls the overall operation of the mobile robot 100 by controlling the image acquisition unit 120, the input unit 125, the traveling unit 160, the cleaning unit 130, and the like which constitute the mobile robot 100.

The control unit 150 may process a voice input signal of a user received through the microphone of the input unit 125 and perform a voice recognition process. According to the embodiment, the mobile robot 100 may include a voice recognition module that performs voice recognition inside or outside the control unit 150.

According to the embodiment, simple voice recognition may be performed by the mobile robot 100 itself, and higher-level voice recognition such as natural language processing may be performed by a server 2420.

The memory 105 records various types of information necessary to control the mobile robot 100 and may include a volatile or non-volatile recording medium. A recording medium stores data that can be read by a microprocessor.

Further, a map of traveling areas may be stored in the memory 105. The map may be input by an external terminal or a server that can exchange information with the mobile robot 100 through wired or wireless communication, or may be generated by the mobile robot 100 through self-learning.

The map may display positions of rooms within traveling areas. Additionally, the current position of the mobile robot 100 may be displayed on the map, and the current position of the mobile robot 100 on the map may be updated during a traveling process. The external terminal stores the same map as the map stored in the memory 105.

The memory 105 may store cleaning history information. Such cleaning history information may be generated each time cleaning is performed.

The map of traveling areas stored in the memory 105 may include a navigation map used for traveling during cleaning, a simultaneous localization and mapping (SLAM) map used for position recognition, a learning map in which, when the mobile robot collides with an obstacle, information on the collision is stored to be used during learning cleaning, a global position map used for global position recognition, an obstacle recognition map in which information on recognized obstacles is recorded, and the like.

Meanwhile, although maps can be stored and managed separately in the memory 105 according to purposes, as described above, maps may not be clearly divided by purposes. For example, a plurality of pieces of information may be stored in one map such that the map can be used for at least two purposes.

The control unit 150 may include a traveling control module 151, a map generation module 152, a position recognition module 153, and an obstacle recognition module 154.

Referring to FIGS. 1 to 3, the traveling control module 151 controls traveling of the mobile robot 100 and controls driving of the traveling unit 160 according to travel settings. Additionally, the traveling control module 151 can ascertain a traveling route of the mobile robot 100 on the basis of the operation of the traveling unit 160. For example, the traveling control module 151 can ascertain the current or past moving speed and distance traveled by the mobile robot 100 on the basis of the rotation speed of the wheel unit 111, and the position of the mobile robot 100 can be updated on the map on the basis of traveling information of the mobile robot 100 ascertained in this manner.

The map generation module 152 can generate a map of traveling areas. The map creation module 152 can create a map by processing images acquired through the image acquisition unit 120. That is, the map generation module 152 can create a cleaning map corresponding to cleaning areas.

In addition, the map generation module 152 can process images acquired through the image acquisition unit 120 at each position and associate the images with the map to recognize the global position.

The position recognition module 153 estimates and recognizes the current position. The position recognition module 153 can ascertain the position in association with the map generation module 152 using image information of the image acquisition unit 120, thereby estimating and recognizing the current position even when the position of the mobile robot 100 suddenly changes.

Additionally, the position recognition module 153 can recognize attributes of the area in which the mobile robot is currently located. That is, the position recognition module 153 can recognize a space.

The mobile robot 100 can recognize the position thereof during continuous traveling through the position recognition module 153, create a map and estimate the current position through the map generation module 152 and the obstacle recognition module 154 without the position recognition module 153.

While the mobile robot 100 is traveling, the image acquisition unit 120 acquires images around the mobile robot 100. Hereinafter, an image acquired by the image acquisition unit 120 is defined as an "acquired image".

An acquired image includes various features such as lights located on the ceiling, edges, corners, blobs, and ridges.

The map generation module 152 detects features from each acquired image and calculates a descriptor based on each feature point.

The map generation module 152 may classify at least one descriptor for each acquired image into a plurality of groups according to a predetermined sub-classification rule on the basis of descriptor information obtained through acquired images at each position, and convert descriptors included in the same group into sub-representative descriptors according to a predetermined sub-representative rule.

As another example, all descriptors collected from acquired images in a predetermined area, such as a room, may be classified into a plurality of groups according to the predetermined sub-classification rule, and descriptors included in the same group may be converted into sub-representative descriptors according to the predetermined sub-representative rule.

The map generation module 152 can obtain a feature distribution of each position through this process. Each position feature distribution can be represented as a histogram or an n-dimensional vector. As another example, the map generation module 152 may estimate an unknown current position on the basis of a descriptor calculated from each feature point without going through the predetermined sub-classification rule and the predetermined sub-representative rule.

Additionally, in a case where the current position of the mobile robot 100 becomes unknown due to a position jump or the like, the current position can be estimated on the basis of data such as pre-stored descriptors or sub-representative descriptors.

The mobile robot 100 acquires an acquired image through the image acquisition unit 120 at an unknown current position. Various features such as lights located on the ceiling, edges, corners, blobs, and ridges are confirmed through the image.

The position recognition module 153 detects features from the acquired image and calculates a descriptor.

The position recognition module 153 converts the features into information (sub-recognition feature distribution) that can be compared with position information (e.g., feature distribution of each position) to be compared according to a predetermined sub-conversion rule on the basis of at least one piece of recognition descriptor information obtained through the acquired image of the unknown current position.

According to a predetermined sub-comparison rule, each position feature distribution can be compared with each recognition feature distribution to calculate each similarity. Similarity (probability) is calculated for each position, and the position with the highest probability can be determined as the current position.

In this manner, the control unit 150 can divide traveling areas and create a map consisting of a plurality of areas, or recognize the current position of the main body 110 on the basis of a pre-stored map.

When a map is created, the control unit 150 may transmit the generated map to an external terminal, a server, or the like through the communication unit 190. Additionally, as described above, when a map is received from an external terminal, a server, or the like, the control unit 150 can store the map in the memory 105.

In this case, the map may include a cleaning area divided into a plurality of areas, connecting passages connecting the plurality of areas, and information on obstacles within the areas.

When a cleaning command is input, the control unit 150 determines whether the current position of the mobile robot matches the position on the map. The cleaning commands may be input through a remote controller, the input unit, or the external terminal.

If the current position does not match the position on the map or the current position cannot be confirmed, the control unit 150 may recognize the current position, restore the current position of the mobile robot 100, and then control the traveling unit 160 such that the mobile robot 100 moves to a designated area on the basis of the current position.

If the current position does not match the position on the map or the current position cannot be confirmed, the position recognition module 153 may analyze the acquired image input from the image acquisition unit 120 and estimate the current position on the basis of the map. Further, the obstacle recognition module 154 or the map generation module 152 can also recognize the current position in the same manner.

After recognizing the position and restoring the current position of the mobile robot 100, the traveling control module 151 calculates a traveling route from the current position to a designated area and controls the traveling unit 160 such that the mobile robot moves to the designated area.

When cleaning pattern information is received from a server, the traveling control module 151 may divide the entire traveling area into a plurality of areas and set one or more areas as a designated area according to the received cleaning pattern information.

Additionally, the traveling control module 151 may calculate a driving route according to the received cleaning pattern information and control the mobile robot to travel along the driving route to perform cleaning.

Upon completion of cleaning of the designated area, the control unit 150 may store the cleaning record in the memory 105.

Additionally, the control unit 150 may transmit the operating status of the mobile robot 100 or the cleaning status to the external terminal or the server at predetermined intervals through the communication unit 190.

Accordingly, the external terminal displays the position of the mobile robot along with the map on the screen of the application being executed and outputs information on the cleaning status on the basis of received data.

The mobile robot 100 according to an embodiment of the present disclosure may move in one direction until an obstacle or wall is detected, and when the obstacle recognition module 154 recognizes an obstacle, determine a traveling pattern such as moving straight or turning according to attributes of the recognized obstacle.

Meanwhile, the control unit 150 may control the mobile robot to travel while avoiding the obstacle in a different pattern on the basis of the attributes of the recognized obstacle. The control unit 150 may control the mobile robot to travel while avoiding the obstacle in a different pattern depending on the attributes of the obstacle, such as a non-hazardous obstacle (general obstacle), a dangerous obstacle, or a movable obstacle.

For example, the control unit 150 may control the mobile robot to detour and avoid a dangerous obstacle while securing a longer safe distance.

Additionally, in the case of a movable obstacle, if the obstacle does not move after a predetermined waiting time, the control unit 150 may control the mobile robot to perform avoidance traveling corresponding to a general obstacle or avoidance traveling corresponding to a dangerous obstacle. Alternatively, if an avoidance traveling pattern corresponding to a movable obstacle is separately set, the control unit 150 may control the mobile robot to travel according to the avoidance traveling pattern corresponding to a movable obstacle.

The mobile robot 100 according to an embodiment of the present disclosure can perform obstacle recognition and avoidance based on machine learning.

The control unit 150 may include the obstacle recognition module 154 that recognizes obstacles pre-learned through machine learning in an input image, and the traveling control module 151 that controls driving of the traveling unit 160 on the basis of attributes of the recognized obstacle.

Although FIG. 3 shows an example in which the plurality of modules 151, 152, 153, and 154 is separately provided in the control unit 160, the present disclosure is not limited thereto.

For example, the position recognition module 153 and the obstacle recognition module 154 may be integrated into one recognizer and configured as one recognition module 155. In this case, the recognizer may be trained using a learning technique such as machine learning, and the trained recognizer may classify input data and recognize attributes of areas, objects, and the like.

According to the embodiment, the map generation module 152, the position recognition module 153, and the obstacle recognition module 154 may be configured as one integrated module.

Hereinafter, an embodiment in which the position recognition module 153 and the obstacle recognition module 154 are integrated into one recognizer and configured as one recognition module 155 will be mainly described, but the position recognition module 153 and the obstacle recognition module 154 can also operate in the same manner when they are separately provided.

The mobile robot 100 according to an embodiment of the present disclosure may include the recognition module 155 that has learned attributes of objects and spaces through machine learning.

Machine learning means that a computer learns from data without a person directly instructing the computer to use logic, and accordingly the computer solves problems on its own.

Deep learning is a method of teaching computers how to think like humans based on an artificial neural network (ANN) for constructing artificial intelligence and is artificial intelligence technology by which a computer learns like humans on its own without humans teaching the computer.

The artificial neural network (ANN) may be implemented in a software form or in a hardware form such as a chip.

The recognition module 155 may include an artificial neural network (ANN) in the form of software or hardware, which has learned attributes of spaces and attributes of objects such as obstacles.

For example, the recognition module 155 may include a deep neural network (DNN) such as a convolutional neural network (CNN), a recurrent neural network (RNN), or a deep belief network (DBN) trained through deep learning.

The recognition module 155 can determine attributes of a space and an object included in input image data on the basis of weights between nodes included in the deep neural network (DNN).

Meanwhile, the traveling control module 151 may control driving of the traveling unit 160 on the basis of the recognized attributes of the space and obstacle.

Meanwhile, the recognition module 155 may recognize attributes of a space and an obstacle included in a selected specific viewpoint image on the basis of data pre-trained through machine learning.

Meanwhile, the memory 105 may store input data for determining attributes of spaces and objects, and data for training the deep neural network (DNN).

The memory 105 may store original images acquired by the image acquisition unit 120 and extracted images obtained by extracting predetermined areas.

Additionally, depending on the embodiment, weights and biases forming the architecture of the deep neural network (DNN) may be stored in the memory 105.

Alternatively, depending on the embodiment, the weights and biases forming the architecture of the deep neural network may be stored in an embedded memory of the recognition module 155.

Meanwhile, the recognition module 155 may perform a learning process using a predetermined image as training data whenever the image acquisition unit 120 acquires an image or extracts a partial area of an image, or perform the learning process after a predetermined number of images or more is obtained.

Alternatively, the mobile robot 100 may receive data related to machine learning from the predetermined server through the communication unit 190.

In this case, the mobile robot 100 may update the recognition module 155 on the basis of the data related to machine learning received from the predetermined server.

Figure 4:
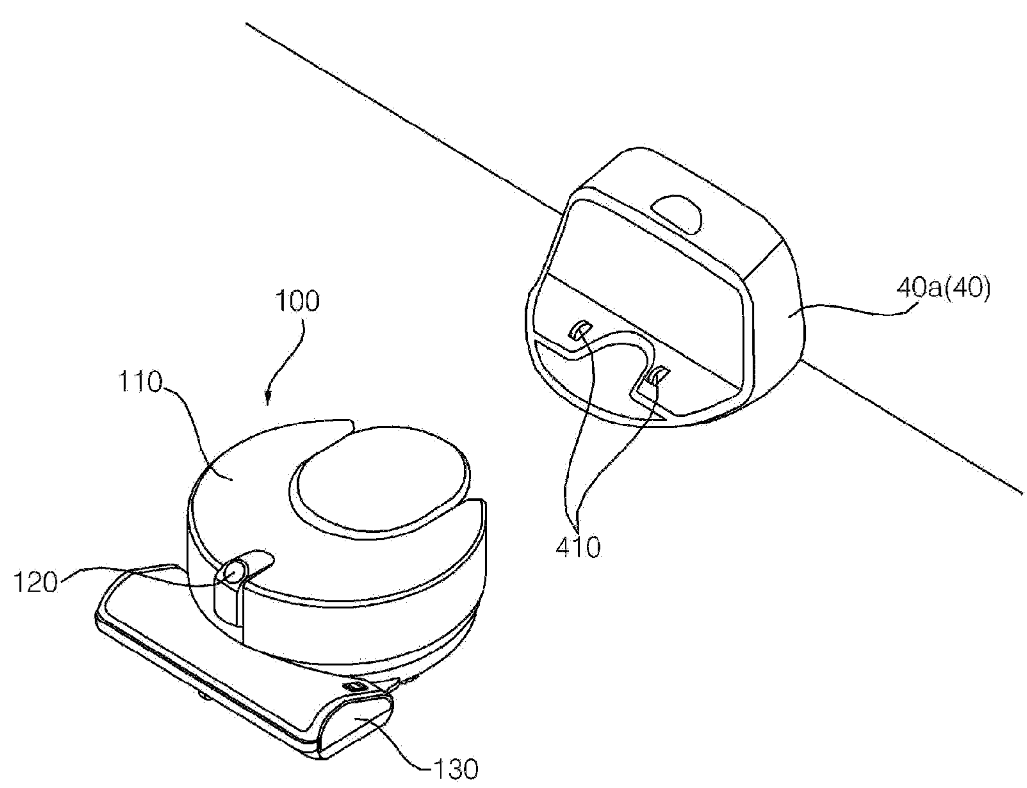
FIG. 4 is a perspective view showing a mobile robot and a docking station according to an embodiment of the present disclosure.

FIG. 4 is a perspective view showing the mobile robot and a docking station according to an embodiment of the present disclosure.

The mobile robot 100 can be docked with the docking station 40 after traveling.

The docking station 40 is electrically connected to a commercial power source. According to the embodiment, the docking station 40 may convert commercial power into power for charging the battery 210 of the mobile robot 100.

The mobile robot 100 is electrically connected to the commercial power source through contact with a charging terminal 410 of the docking station 40 such that the battery 210 can be charged.

The electrical components constituting the mobile robot 100 can receive power from the battery 210. Therefore, when the battery 210 is charged, the mobile robot 100 can travel by itself even when electrically separated from the commercial power source.

Since the docking station 40 provides a function of charging the battery 210 of the mobile robot 100, the docking station 40 may also be called a charging station.

Meanwhile, the docking station 40*a* illustrated in FIG. 4 provides the function of charging the battery 210 of the docked mobile robot 100.

According to the embodiment, the docking station 40 may provide a function of emptying the dust bin 140 of the mobile robot 100.

Figure 5:
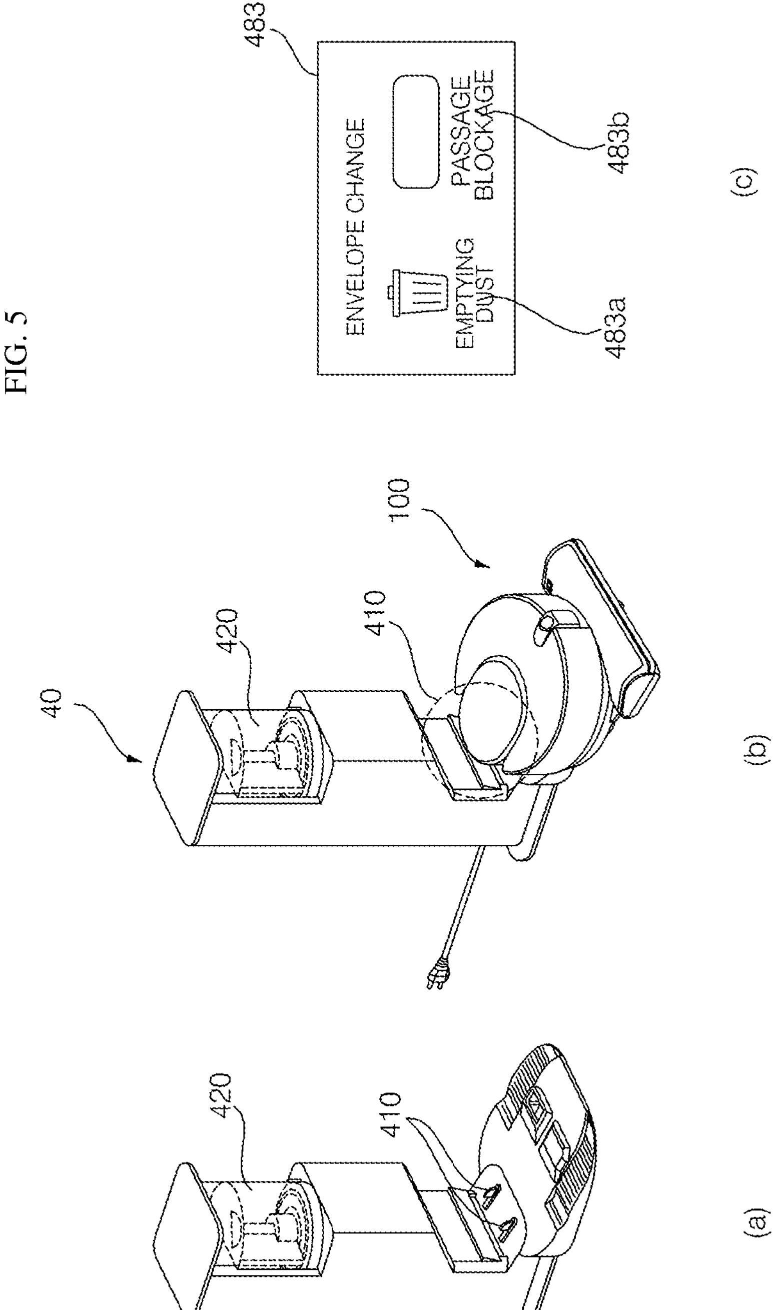
FIGS. 5(*a*) to (*c*) is a diagram referenced in description of the docking station according to an embodiment of the present disclosure.

FIG. 5 is a diagram referenced in description of the docking station according to an embodiment of the present disclosure, in which (a) of FIG. 5 is a perspective view of a docking station 40*b* (40) connected to the commercial power source, (b) of FIG. 5 shows a state in which the mobile robot 100 is docked with the docking station 40*b* (40), and (c) of FIG. 5 shows a display indicator of the docking station 40*b* (40).

The docking station 40*b* illustrated in FIG. 5 provides the function of charging the battery 210 of the docked mobile robot 100 and the function of emptying the dust bin 140 of the mobile robot 100.

The docking station 40*b* includes a charging terminal 410 and can charge the battery 210 of the mobile robot 100 that is in contact with the charging terminal 410. Additionally, the docking station 40*b* may perform power line communication with the mobile robot 100 through the charging terminal 410 and a charging cable (refer to 600 in FIG. 7 and the like).

The docking station 40*b* includes a dust collection chamber 420 and a suction motor, and can empty the dust in the dust bin of the docked mobile robot 100 by sucking the dust into the dust collection chamber 420. Additionally, the docking station 40*b* may further include a door motor that automatically opens and closes a passage door to the dust collection chamber 420.

The docking station 40*b* may include an output means indicating at least one of a suction motor driving state, a docking state, a charging state, or a charging level. At least one of the suction motor driving state, docking state, charging state, or charging level may be displayed on a display. Alternatively, at least one of the suction motor driving state, docking state, charging state, or charging level may be displayed through lighting, blinking, or color of a lamp.

The docking station 40*b* may include a pressure sensor capable of detecting dust present in the dust collection chamber 420. The pressure sensor can at least detect whether the dust collection chamber 420 is full of dust.

The docking station 40*b* may include an indicator 483 related to the dust bin emptying function of the mobile robot 100. The indicator 483 may be disposed on the front of the docking station 40*b*.

The indicator 483 includes a first indicator 483*a* that indicates dust bin emptying notification information to guide emptying of dust in the dust collection chamber 420, and a second indicator 483*b* that indicates blockage of a suction passage of the dust collection chamber 420.

Figure 6:
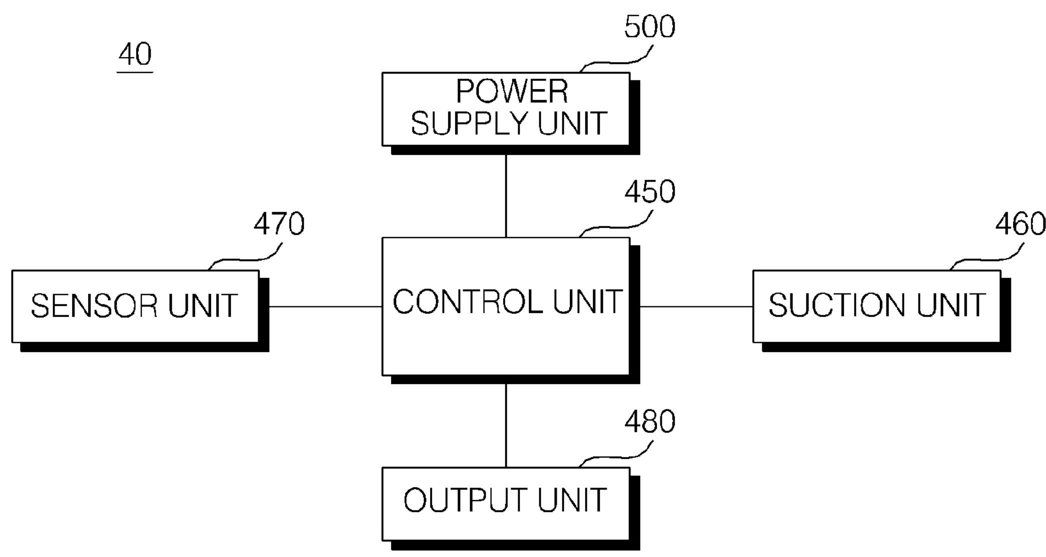
FIG. 6 is an internal block diagram of the docking station according to an embodiment of the present disclosure.

FIG. 6 is an internal block diagram of the docking station according to an embodiment of the present disclosure.

Referring to FIG. 6, the docking station 40 includes a power supply unit 500 that charges the battery 210 of the mobile robot 100, an output unit 480 that outputs status information such as the indicator 483, a sensor unit 470 including one or more sensors, and a control unit 450 that controls the overall operation of the docking station 40.

The power supply unit 500 is connected to the commercial power source and can supply driving power required for operation of the docking station 40 and power for charging the battery 210.

The control unit 450 may control the power supply unit 500 to charge the battery 210 of the docked mobile robot 100. The control unit 450 may be composed of a printed circuit board and elements mounted on the printed circuit board.

The sensor unit 470 may include sensors for sensing various types of data related to the operation and state of the docking station 40.

Meanwhile, the docking station 40*b* according to an embodiment of the present disclosure may further include a suction unit 460 for emptying the dust bin 140 of the mobile robot 100. The suction unit 460 includes the dust collection chamber 420 for receiving dust therein and a suction motor for sucking dust in the dust bin 140 of the mobile robot 100 into the dust collection chamber 420, and is capable of emptying dust in the internal dust bin of the docked mobile robot 100 by sucking the dust into the dust collection chamber 420.

In addition, the docking station 40*b* may further include a passage connected to the dust collection chamber 420, a door disposed at the passage, and a door motor that automatically opens and closes the passage door.

Upon determining that the mobile robot 100 is docked, the control unit 450 can operate the door motor to open the passage door of the docking station 40*b*.

The control unit 450 can operate the suction motor to suck in dust in the dust bin 140. The sucked dust can be contained in the dust collection chamber 420.

The sensor unit 470 may include a sensor that detects dust contained in the dust collection chamber 420. For example, the sensor unit 470 may include a pressure sensor, and the pressure sensor can sense whether the dust collection chamber 420 is full, the amount of dust collected, and the like.

Upon determining that the dust collection chamber 420 needs to be emptied on the basis of sensing data of the sensor unit 470, the control unit 450 may control the first indicator 483*a* such that the first indicator 483*a* indicates dust bin emptying notification information for guiding emptying of the dust in the dust collection chamber 420.

Meanwhile, the mobile robot 100 and the docking station 40 may perform power line communication through the charging cable 600. The power supply unit 200 of the mobile robot 100 may perform power line communication under the control of the control unit 150. The power supply unit 500 of the docking station 40 may perform power line communication under the control of the control unit 450. The power supply units 200 and 500 can perform bidirectional communication through power line communication.

Figure 7:
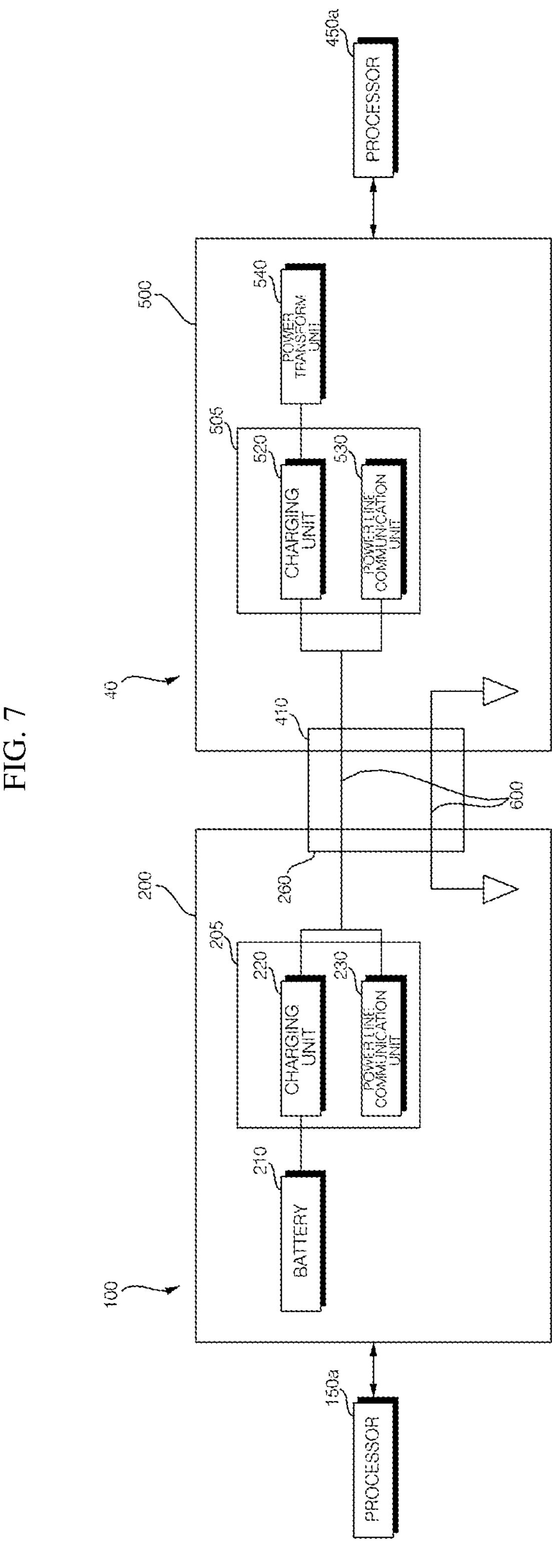
FIG. 7 is a block diagram showing a control relationship between major components related to charging and communication of the mobile robot and the docking station according to an embodiment of the present disclosure.

FIG. 7 is a block diagram showing a control relationship between major components related to charging and communication of the mobile robot and the docking station according to an embodiment of the present disclosure.

Referring to FIG. 7, the power supply unit 200 (hereinafter referred to as a first power supply unit) of the mobile robot 100 may include the battery 210 housed inside the main body 110, and a charging terminal (260, hereinafter referred to as a first charging terminal) electrically connected to the battery 210. Additionally, the first power supply unit 200 may include a power circuit 205 connected to the first charging terminal 260.

The power supply unit 500 (hereinafter referred to as a second power supply unit) of the docking station 40 may include the charging terminal (410, hereinafter referred to as a second charging terminal) electrically connected to the first charging terminal 260, and a power circuit 505 electrically connected to the second charging terminal 410.

The traveling unit 160 moves the main body 110 containing the battery 210 therein to the docking station 40. The main body 100 includes the first charging terminal 260. As the mobile robot 100 docks with the docking station 40, the first charging terminal 260 of the mobile robot 100 is in contact with the second charging terminal 410 of the docking station 40, and accordingly, the first and second power supply units 200 and 500 can be electrically connected through the charging cable 600.

The first power supply unit 200 includes a charging unit (220, hereinafter referred to as a first charging unit) that receives power from the station 40 through the charging cable 600 and charges the battery 210, and a power line communication unit (230, hereinafter referred to as a first power line communication unit) that performs power line communication with the station 40 through the charging cable 600.

The second power supply unit 500 may also include the same configuration as the first power supply unit 200. The second power supply unit 500 includes a charging unit (520, hereinafter referred to as a second charging unit) that supplies power to charge the battery 210 of the mobile robot 100 through the charging cable 600, and a power line communication unit (530, hereinafter referred to as a second power line communication unit) that performs power line communication with the mobile robot 100 through the charging cable 600.

The docking station 40 may transmit dust collection chamber emptying notification information to the mobile robot 100 through the second power line communication unit 530 on the basis of data detected by the sensor unit 470.

The second power supply unit 500 may further include a power transform unit 540 that transforms commercial power into power for charging the battery 210 of the mobile robot 100.

The mobile robot 100 and the docking station 40 may perform power line communication under the control of processors 150*a* and 450*a*, respectively. The processors 150*a* and 450*a* may be implemented as some blocks of the control units 150 and 450. Alternatively, the processors 150*a* and 450*a* may be provided in the first and second power supply units 200 and 500 separately from the control units 150 and 450. In this case, the processors 150*a* and 450*a* may perform power line communication under the control of the control units 150 and 450.

There may be no need for an additional configuration for wireless communication between the mobile robot 100 and the docking station 40 according to power line communication. That is, power is supplied to the battery 210 through the power supply units 200 and 500 and thus the battery 210 can be charged and the mobile robot 100 can be operated, and communication between the mobile robot 100 and the docking station 40 can be achieved through power lines for power supply unit. According to power line communication, a data signal can be modulated into a specific signal (for example, a high-frequency signal) and transmitted through a line for DC power transmission. Power line communication has the advantage of being able to construct a communication network at low cost without installing special additional communication lines by using power lines that have already been secured.

Figure 8:
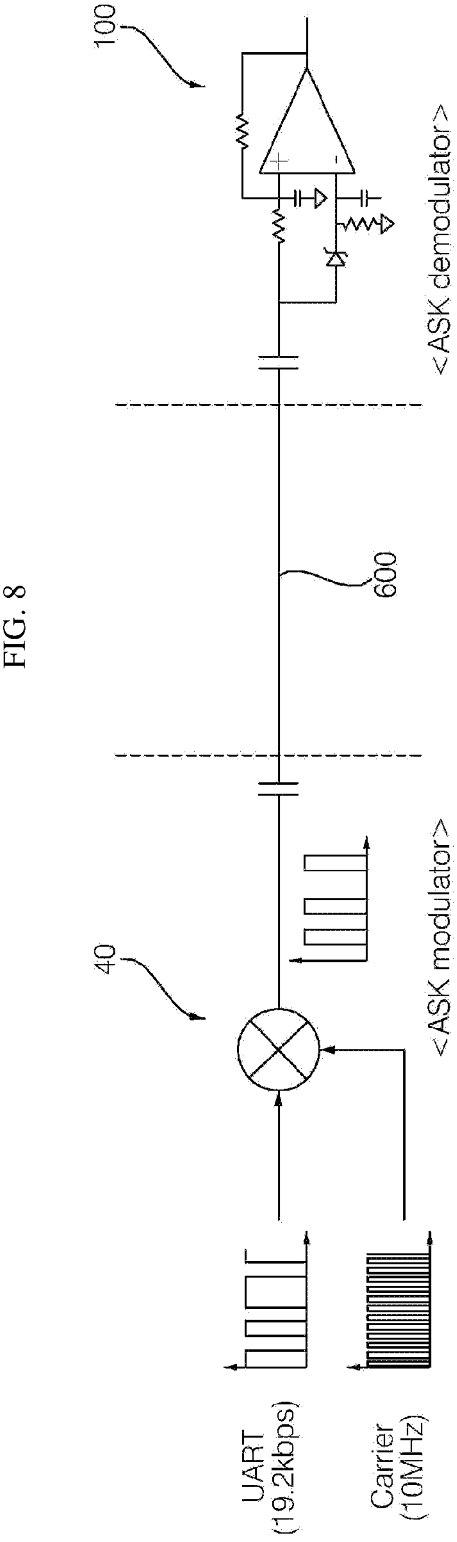
FIGS. 8 and 9 are diagrams referenced in description of power line communication according to an embodiment of the present disclosure.
Figure 9:
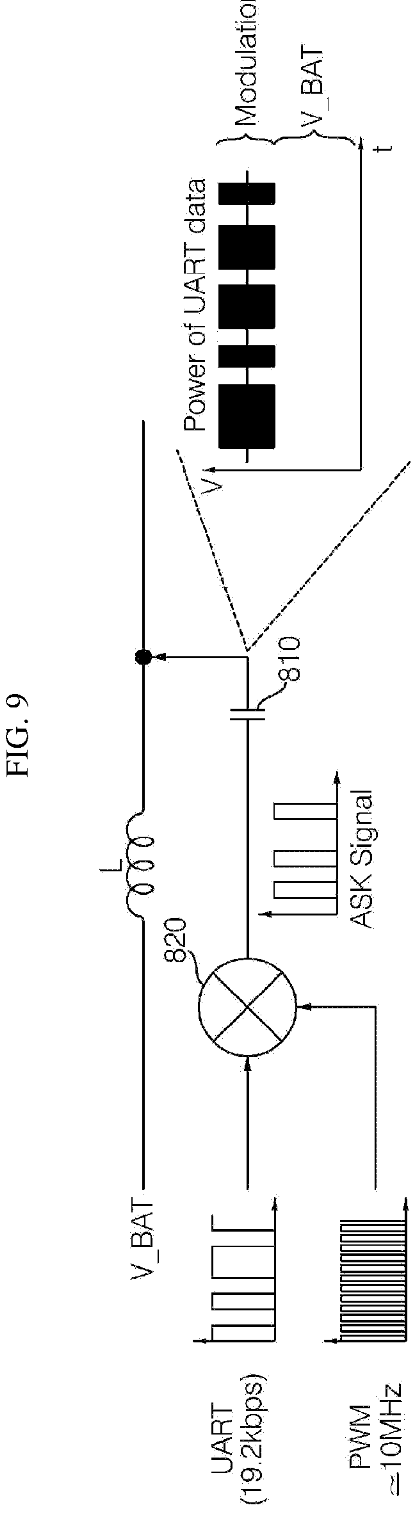

FIGS. 8 and 9 are diagrams referenced in description of power line communication according to an embodiment of the present disclosure.

Referring to FIG. 8, the docking station 40 may include an amplitude shift keying (ASK) modulator, mix a universal asynchronous receiver/transmitter (UART) communication signal with a carrier frequency and transmit the same through the charging cable 600.

The mobile robot 100 may include an ASK demodulator, and check data by demodulating a signal received through the charging cable 600.

Signals can be transmitted and received through the charging cable 600 which is a power line for charging between the mobile robot 100 and the docking station 40. The mobile robot 100 and the docking station 40 can ASK modulate/demodulate a UART signal and transmit/receive the same over the power line for bidirectional communication.

Although FIG. 8 illustrates a case in which the docking station 40 performs ASK modulation and the mobile robot 100 performs ASK demodulation, both the docking station 40 and the mobile robot 100 may perform ASK modulation/demodulation for bidirectional communication.

Referring to FIG. 9, each of the first and second power line communication units 230 and 530 includes a mixer 820, and can generate an ASK signal by loading a UART signal on a high-frequency PWM signal. The ASK signal output from the mixer 820 is AC coupled at a capacitor 810 and transmitted along with a battery voltage V_BAT that has passed through a power inductor L through the charging cable 600.

A voltage V obtained by adding the voltage of the modulated signal to the battery voltage V_BAT can be transmitted through the charging cable 600.

According to an embodiment of the present disclosure, when the dust bin 140 is full, the mobile robot 100 may request that the docking station 40 empty the dust bin through power line communication.

In addition, the docking station 40 may transmit information on the amount of collected dust to the mobile robot 100 through power line communication, and the mobile robot 100 may notify a customer of the information on the amount of collected dust from the docking station 40 through the communication unit 190, such as Wi-Fi.

Additionally, the mobile robot 100 may receive an update file for the docking station 40 through the communication unit 190 and transmit the received update file to the docking station 40 through power line communication.

The services provided by the docking station 40 are related to the mobile robot 100, and communication of the docking station 40 mostly involves transmitting/receiving data to/from the mobile robot 100. Accordingly, it is possible to implement a low-cost communication structure using the charging cable 600 which is essential for charging the battery 210 without being equipped with an expensive communication module such as a Wi-Fi module in the docking station 40. Accordingly, the docking station 40 can perform bidirectional communication with the mobile robot 100, and communication with an external device can be performed via the mobile robot 100.

The mobile robot 100 may transmit at least one of status information, an update file, or a dust bin emptying request signal to the docking station 40 through power line communication.

The docking station 40 can transmit at least one of status information such as information on the amount of collected dust of the dust collection chamber 420 or a response to a request received from the mobile robot 100 to the mobile robot 100 through power line communication.

According to one embodiment, power line communication may be implemented through time division communication. Power line communication can be implemented with an arbitrary communication protocol in which power line communication signals do not occupy a power line (2-wire) at the same time and have a pre-arranged signal transmission order. Accordingly, in the process of power line communication between the mobile robot 100 and the docking station 40, transmission and reception signals do not always occupy the power lines and can be intermittently used for communication only when necessary.

According to one embodiment, power line communication may be implemented in an asynchronous communication manner. According to one embodiment, through asynchronous power line communication, the mobile robot 100 and the docking station 40 do not need to share a clock signal for synchronizing the timing for transmitting and receiving signals. As power line communication is implemented in an asynchronous manner, the mobile robot 100 and the docking station 40 do not need to synchronize operation processing units at the same time, and thus processing times based on signals transmitted/received through power line communication between the mobile robot 100 and the docking station 40 do not have to match.

As described above, various differentiated functions can be applied to the mobile robot 100 and the docking station 40 to provide customer value. Here, by performing bidirectional high-speed data communication by carrying an asynchronous communication signal on the 2-wire charging power line 600, material costs can be reduced and various differentiated functions can be applied to provide customer value.

Figure 10:
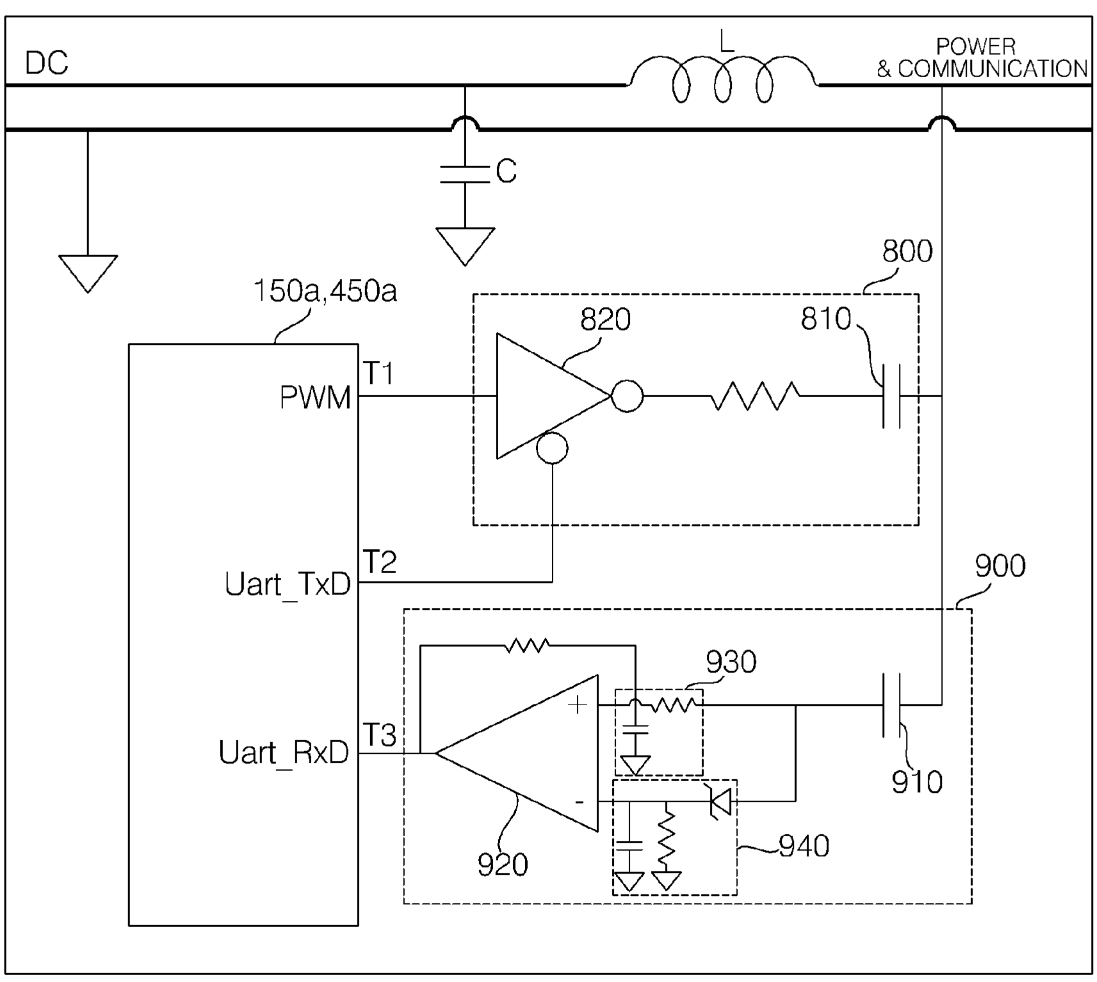
FIG. 10 is a diagram showing a power supply circuit according to an embodiment of the present disclosure.

FIG. 10 is a diagram showing a power supply circuit according to an embodiment of the present disclosure.

Figure 11:
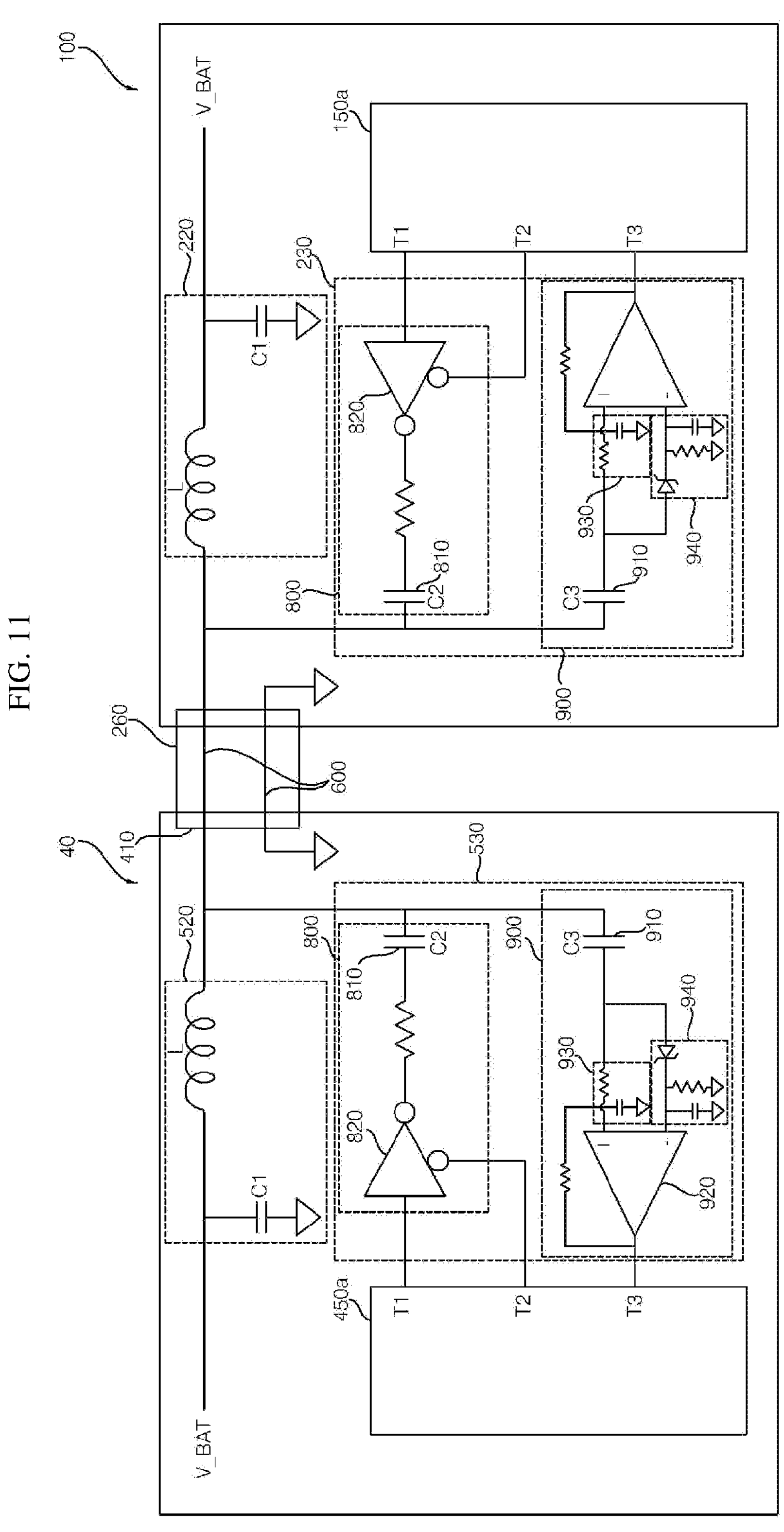
FIG. 11 is a diagram showing power supply circuits of the mobile robot and the docking station according to an embodiment of the present disclosure.

FIG. 11 is a diagram showing power supply circuits of the mobile robot and the docking station according to an embodiment of the present disclosure, and showing an example in which the mobile robot 100 and the docking station 40 each include the circuit of FIG. 10.

Referring to FIGS. 10 and 11, the first and second power supply units 200 and 500 may include the first and second charging units 220 and 520 and the first and second power line communication units 230 and 530, respectively.

The first and second power line communication units 230 and 530 may include a transmission unit 800 and a reception unit 900.

The transmission unit 800 may include a mixer 820 that mixes a serial communication signal with a carrier signal to generate a transmission signal modulated with on-off keying (OOK), and a capacitor (C2) 810 disposed between the mixer 820 and the charging cable 600. The reception unit 900 can demodulate a received signal modulated with OOK.

On-off keying (OOK) transmits a carrier signal and a data signal simultaneously. At this time, data can be determined based on presence or absence of the carrier signal.

Amplitude shift keying (ASK) determines the amplitude of the carrier signal based on information data. OOK is a modulation method by which bit information of digital data is represented by the presence or absence of a carrier signal, and is one of ASK methods for representing a symbol through changes in amplitude.

For example, OOK may modulate a signal by including a carrier signal in the signal if data is high (e.g., 1) and removing the carrier signal if the data is low (e.g., 0) at the time of transmitting the signal. During demodulation, data can be determined as high if the carrier signal is higher than a reference value, and the data can be determined as low if the carrier signal is lower than the reference value.

Alternatively, OOK may modulate a signal by including a carrier signal in the signal if data is low and removing the carrier signal if the data is high at the time of transmitting the signal. During demodulation, data can be determined as high if the carrier signal is lower than a reference value, and the data can be determined as low if the carrier signal is higher than the reference value.

The mixer 820 may be an OOK modulator that mixes transmission data with a high-frequency (e.g., 10 MHz) carrier signal and modulates the mixed signal. The mixer 820 may generate a transmission signal by mixing a serial communication signal including transmission data with the carrier signal.

The mixer 820 may include a three-state buffer. A 3-state buffer is a buffer with three output levels (high, low, and high impedance (Hi-Z)). High impedance is an open state in which an external input and output are not connected and can prevent elements from being damaged due to circuit collision in a bus structure that connects multiple elements to one line. According to an embodiment of the present disclosure, the transmission signal generated by the mixer 820 can be output in such a manner that the carrier signal is output only when the serial communication signal is low and the transmission signal is output in the high impedance (High-Z) state when the serial communication signal is high.

Meanwhile, the mobile robot 100 may include the first processor **150*a* that processes power line communication data, and the docking station 20 may include the second processor 450*a* that processes power line communication data. The first and second processors 150*a* and 450*a*** may be microcomputer units (MCUs) that control the power line communication process.

The first and second processors **150*a* and 450*a* may generate data for power line communication, extract data from received signals, and determine the data. The first and second processors 150*a* and 450*a* may generate the carrier signal and the serial communication signal. The first and second processors 150*a* and 450*a*** may generate a high-frequency carrier signal and asynchronous serial communication data.

The first and second processors **150*a* and 450*a* may include input/output terminals. The first and second processors 150*a* and 450*a* may include output terminals T1 and T2. The first and second terminals T1 and T2 are connected to the mixer 820. The first and second processors 150*a* and 450*a* output the carrier signal to the mixer 820 through the first terminal T1 and output the serial communication signal to the mixer 820 through the second terminal T1**.

A transmission signal (OOK modulated signal) output from the mixer 820 is AC coupled at the capacitor 810 and sent over the charging cable 600. The transmission unit 800 may have an OOK modulation and power line coupling circuit structure in which a UART signal is carried on a high-frequency carrier.

The first and second charging units 220 and 520 may include at least one power inductor L. The first and second charging units 220 and 520 may include an LC filter. The first and second charging units 220 and 520 may include a low-pass filter including at least one inductor L and at least one capacitor C. The LC filter can filter an OOK modulated signal such that that the OOK modulated signal does not pass to the line for charging the battery 210.

In the first charging unit 220, the LC filter L and C1 may be disposed at the front end of the battery 210. In the second charging unit 520, the LC filter L and C1 may be disposed on the line through which a battery voltage V_BAT is applied to the charging terminal 410. For example, the LC filter L and C1 may be disposed between the charging cable 600 and the power transform unit 540.

The charging cable 600 may be composed of two wires: a positive line and a negative line of DC power. A ground GND may be connected to the negative line. The first and second charging units 220 and 520 and the first and second power line communication units 230 and 540 can be connected in parallel to the two wires of the charging cable 600.

During docking, the mobile robot 100 and the docking station 40 are connected by wire using the two-wire charging cable 600. Through the two-wire charging cable 600, a power & communication signal that is a mixture of DC power and an OOK modulated signal is transmitted and received, and DC power supply unit and signal transmission can be performed.

Meanwhile, the reception unit 900 may be connected to a third terminal T3 of the first and second processors 150*a* and 450*a*. The reception unit 900 and the transmission unit 800 may be connected in parallel to the charging cable 600.

The reception unit 900 may include an operational amplifier (OP-AMP) 920 connected to the third terminals T3 of the first and second processors 150*a* and 450*a*, an RC filter 930 connected to a first terminal (+) of the operational amplifier 920, an envelope detection unit 940 connected to a second terminal (−) of the operational amplifier 920, and a capacitor (C3) 910 connected to the RC filter 930 and the envelope detection unit 940.

The capacitor (C3) 910 can block a DC voltage applied to the reception unit 900.

An envelope change in an amplitude-modulated carrier signal is the same as the waveform of a data signal. Therefore, the data signal can be restored using the envelope detection unit 940.

The RC filter 930 can output a moving average value based on a received signal, and the envelope detection unit 940 can output an envelope detection signal by detecting an envelope in the received signal.

The operational amplifier 920 is a data slicer that restores data from an input signal, and can restore data by comparing the envelope detection signal with another value and outputting the result. For example, the operational amplifier 920 may restore data by comparing the moving average value and the envelope detection signal and outputting a value of "1" or "O" according to the comparison result. The operational amplifier 920 may compare the moving average value and the envelope detection signal and output an inverted signal.

Moving averages have the advantage of smoothing extreme changes and eliminating noise when data changes significantly. The RC filter 930 may be a moving average filter that performs moving averaging of N predetermined values in successively input signals and outputs the results.

The RC filter 930 can extract a moving average value and then input the moving average value to the first terminal (+) of the operational amplifier 920. The envelope detection unit 940 may input an envelope detection signal to the second terminal (−) of the operational amplifier 920 after envelope detection. The operational amplifier 920 can compare inputs and output an inverted output.

According to embodiments of the present disclosure, supply of power for charging the battery 210 and bidirectional data transmission can be performed through the two-wire charging cable 600 between the docking station 40 and the mobile robot 100. Accordingly, there are no variations in the docking stations 40 and the mobile robots 100, and highly reliable communication that does not require calibration can be realized.

During transmission, UART signals output from the first and second processors 150*a* and 450*a* may be mixed with a high-frequency carrier to generate an OOK modulated transmission signal, and the OOK modulated transmission signal may be AC coupled to the charging cable 600 and transmitted.

During reception, the AC-coupled communication signal may be demodulated into the UART signals by comparing an envelope detection signal and a moving average (RC circuit) signal in the OP-AMP 920, and parsed by the first and second processors 150*a* and 450*a*, to extract data.

UART is generally a type of computer or peripheral device and an individual integrated circuit that serializes parallel data for communication. Since communication is asynchronous, a synchronous signal is not transmitted. In general, each bit is detected by counting from a start bit using a clock signal.

Figure 12:
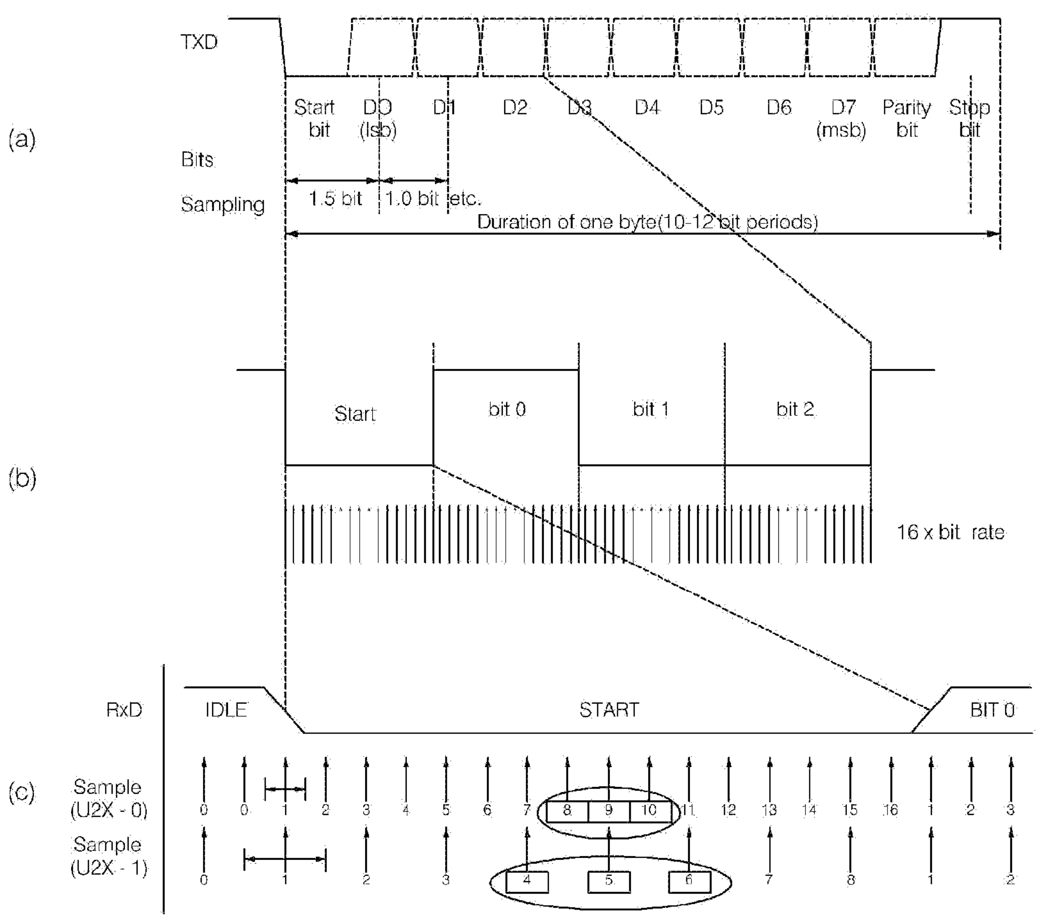
FIG. 12(*a*) to (*c*) is a diagram referenced in description of conditions for acquisition of data of a transmission signal.

FIG. 12 is a diagram referenced in description of conditions for acquisition (sampling) of data of a transmission signal.

FIG. 12(*a*) illustrates a UART frame structure. A start bit means the start of communication and is maintained for a duration of one bit. Data bits D include 5 to 8-bit data. A parity bit is a parity value for error verification and may be removed in some cases. A stop bit indicates the end of communication.

FIG. 12(*b*) illustrates transmission data sampling, and sampling can be performed 16 times per 1 bit of data. FIG. 12(*c*) illustrates transmission data bit sampling, and data can be acquired in three consecutive samplings out of 16 samplings.

That is, UART Rx data frame includes 11 bits, and more accurate data acquisition can be achieved by acquiring data when 3 central pieces of data are consecutive in 16 samplings per bit.

High-frequency OOK modulation is convenient for sending a small amount of data over a power line, and envelope detection and moving average signal comparison allow stable communication even when the power supply voltage fluctuates rapidly. In this way, the first and second power line communication units 230 and 530 can transmit and receive various signals through bidirectional half-duplex communication. The 2-wire power line bidirectional half-duplex OOK modulation/demodulation communication can reduce material costs because it does not require a simple modulation/demodulation circuit and a separate communication line, and has the advantage in various types of communication and service maintenance such as firmware update through high-speed data communication.

Figure 13:
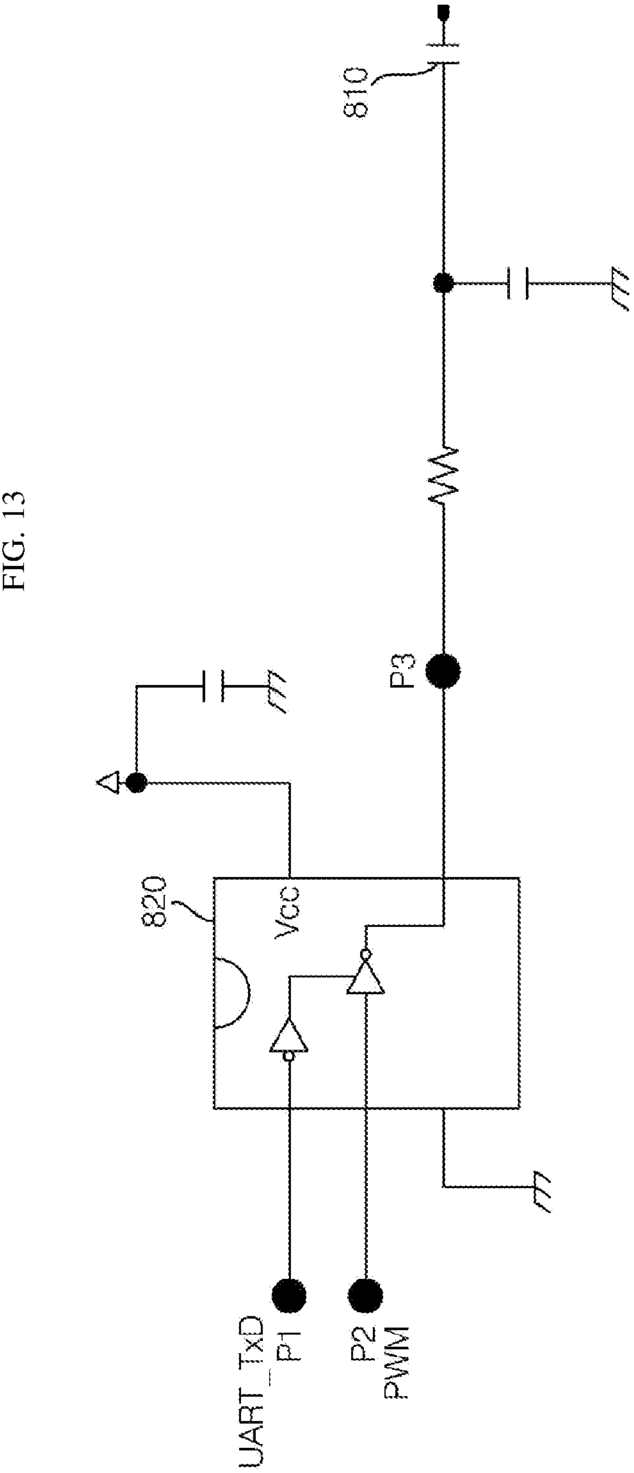
FIG. 13 is a diagram showing a transmission unit circuit according to an embodiment of the present disclosure.
Figure 14:
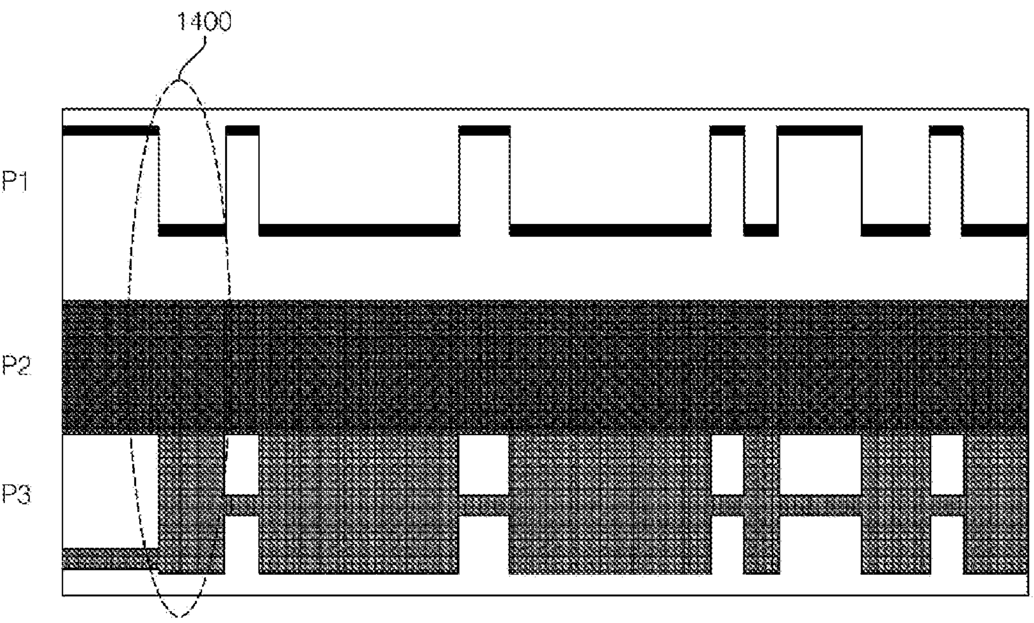
FIGS. 14 and 15 are diagrams showing signals output from the circuit of FIG. 13.
Figure 15:
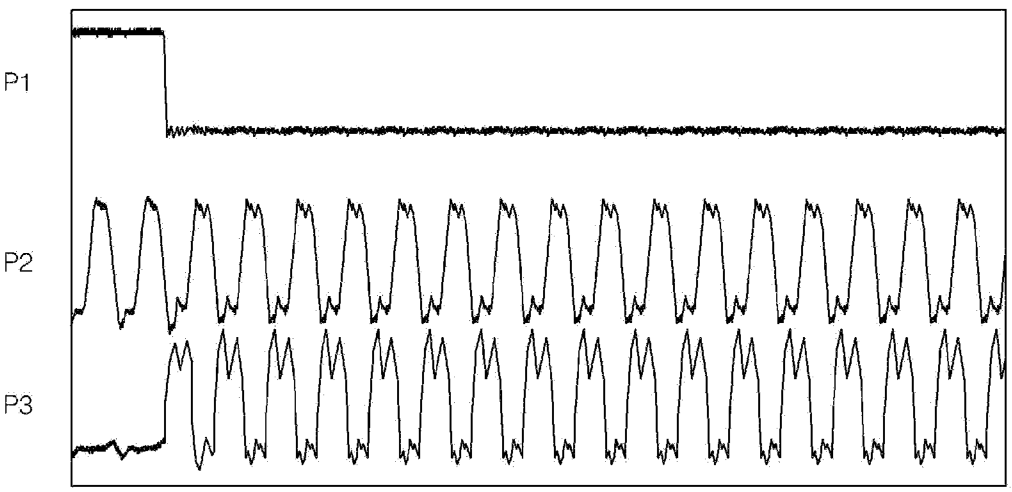

FIG. 13 is a diagram showing a transmission unit circuit according to an embodiment of the present disclosure. FIGS. 14 and 15 are diagrams showing signals output from the circuit of FIG. 13, FIG. 14 shows signal waveforms measured at first to third positions P1 to P3 of FIG. 13, and FIG. 15 is an enlarged view of a portion 1400 of FIG. 14.

Referring to FIGS. 13 to 15, UART transmission (Tx) data and a PWM carrier signal are input to the mixer 820. The UART transmission data is measured at the first position P1 which is an input terminal of the mixer 820, and the carrier frequency is measured at the second position P2 which is the other input terminal of the mixer 820.

Referring to FIGS. 13 to 15, at the third position P3 which is the output terminal of the mixer 820, the carrier signal is output only when the UART transmission data is low, and when the UART transmission data is high, a high impedance High-Z is output. Accordingly, data can be identified on the basis of whether the OOK-modulated signal includes the carrier signal.

Figure 16:
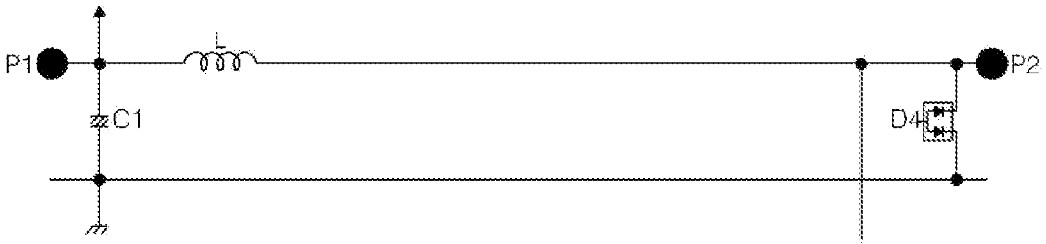
FIG. 16 is a diagram showing a charging circuit according to an embodiment of the present disclosure.
Figure 17:
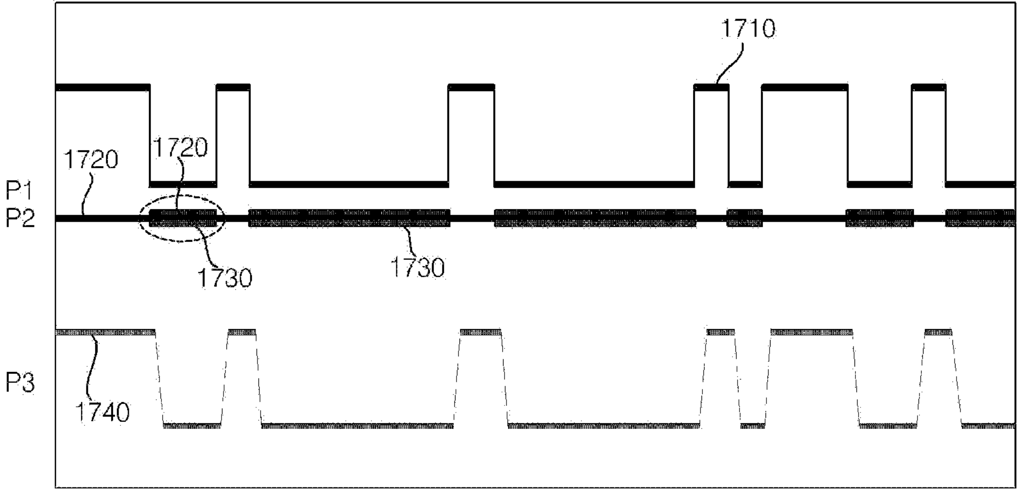
FIG. 17 is a diagram showing signals output from the circuit of FIG. 16.

FIG. 16 is a diagram showing a charging circuit according to an embodiment of the present disclosure. FIG. 17 is a diagram illustrating signals output from the circuit of FIG. 16 and shows signal waveforms measured at a first position P1 and a second position P2 of FIG. 16.

In FIGS. 16 and 17, the first position P1 is a DC section with only the battery charging voltage, and the second location P2 is a DC & communication section with the battery charging voltage and communication signals.

In addition, FIG. 17 shows a signal 1710 that the docking station 40 intends to send to the mobile robot 100, a signal 1720 measured at the first location P1, a signal 1730 measured at the second location P2, and a signal 1740 modulated in the mobile robot as well.

Referring to the signals 1710 to 1740 shown in FIG. 17, it can be ascertained that voltage waveforms with a difference of more than a certain value appear at the first position P1 and the second position P2 depending on the presence or absence of data. In addition, it can be ascertained that the battery 210 can be stably charged during communication at the first position P1 because noise caused by the communication signal is insignificant.

Figure 18:
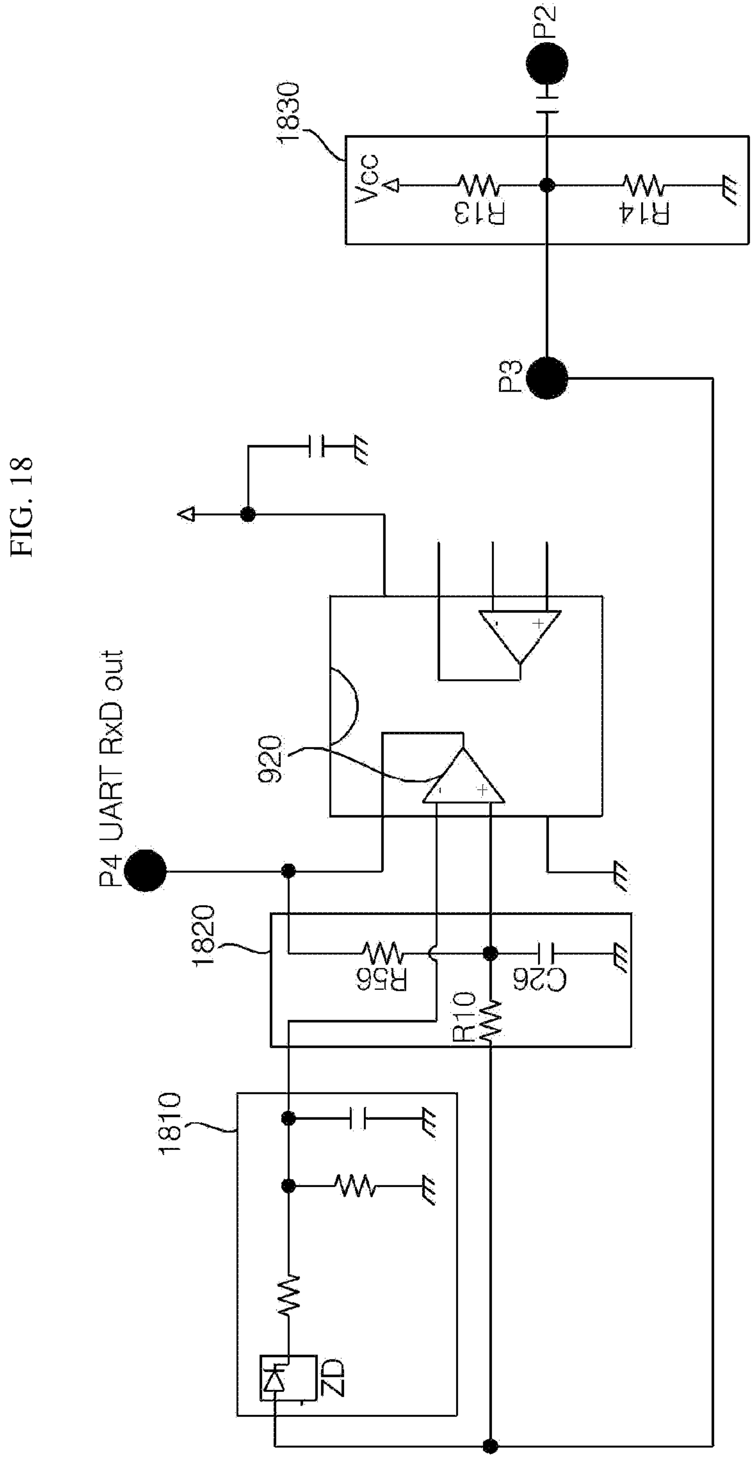
FIG. 18 is a diagram showing a reception unit circuit according to an embodiment of the present disclosure.
Figure 19:
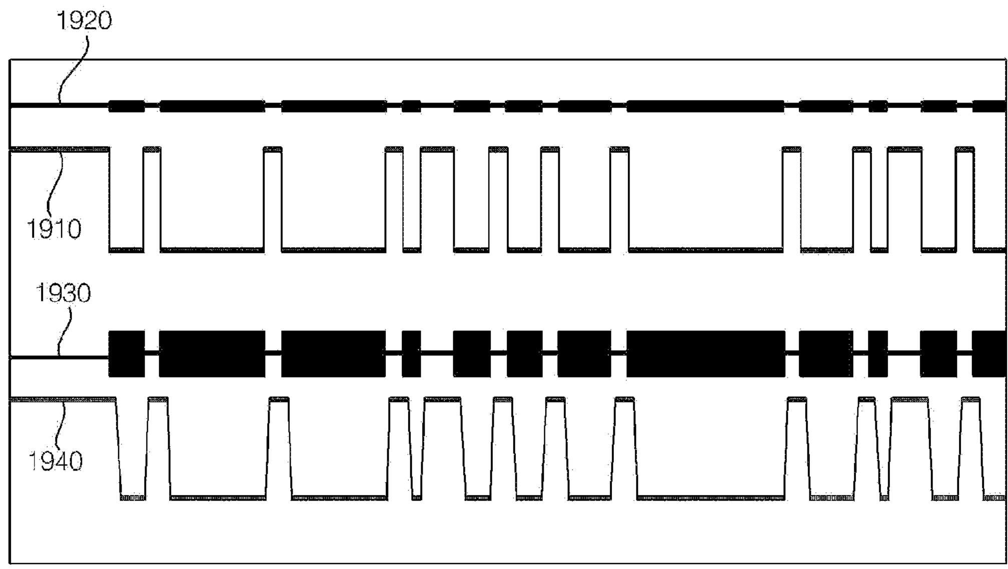
FIGS. 19 and 20 are diagrams showing signals output from the circuit of FIG. 18.
Figure 20:
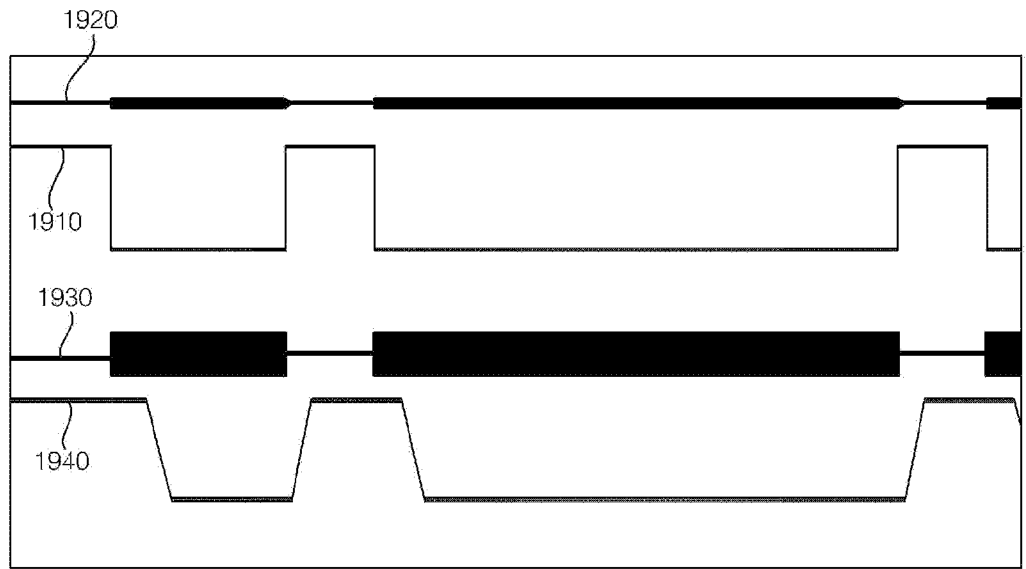

FIG. 18 is a diagram illustrating a reception unit circuit according to an embodiment of the present disclosure. FIGS. 19 and 20 are diagrams illustrating signals output from the circuit of FIG. 18. FIG. 19 shows signal waveforms measured at second to fourth positions P2 to P4 of FIG. 18, and FIG. 20 is an enlarged view of FIG. 19.

Referring to FIGS. 18 to 20, the reception unit may include an envelope detection unit 1810, a moving average RC filter 1820, the OP-AMP 920, and an intermediate voltage unit 1830.

The second position P2 is a DC&ASK section with DC and an ASK signal, the third position P3 is an ASK section with an ASK signal, and the fourth position P4 is a UART received data (RxD) section.

Referring to FIGS. 18 to 20, it can be ascertained that UART transmission data (TxD) 1910 to be sent is ASK modulated and output through a signal 1920 measured at the second position P2 and a signal 1930 measured at the third position P3 only when the UART transmission data 1910 is low.

Additionally, it can be ascertained that the ASK signal is normally demodulated into UART data through a signal 1940 measured at the fourth position P4.

Meanwhile, the OP-AMP 920 may be a hysteresis comparator. For example, a hysteresis value can be calculated according to the following formula.

$$\text{Gain} = -\left(\frac{R56}{R10}\right) = \left(\frac{2.2M}{10K}\right) = 220 \quad \tau = R10 \times C26 = 10K \times 330\text{ pF} = 3.3\text{ ms}$$

$$Fc = \left(\frac{1}{2\pi\ R10\ C26}\right) = 48.2\text{ Hz} \quad UTP = \left(\frac{R10}{R10 + R56}\right) \times Vcc = \left(\frac{10K}{10K + 2.2M}\right) \times 3.3\text{ V} = 14.5\text{ mV}$$

$$Vb = \left(\frac{R14}{R13 + R14}\right) \times Vcc = \left(\frac{51K}{51K + 100K}\right) \times 3.3 = 1.1 \quad \text{Hysteresis Threshold} = UTP - (LTP) = \Delta 29\text{ mV}$$

$$Vo = -\text{Gain} \times Vt + Vb$$

Figure 21:
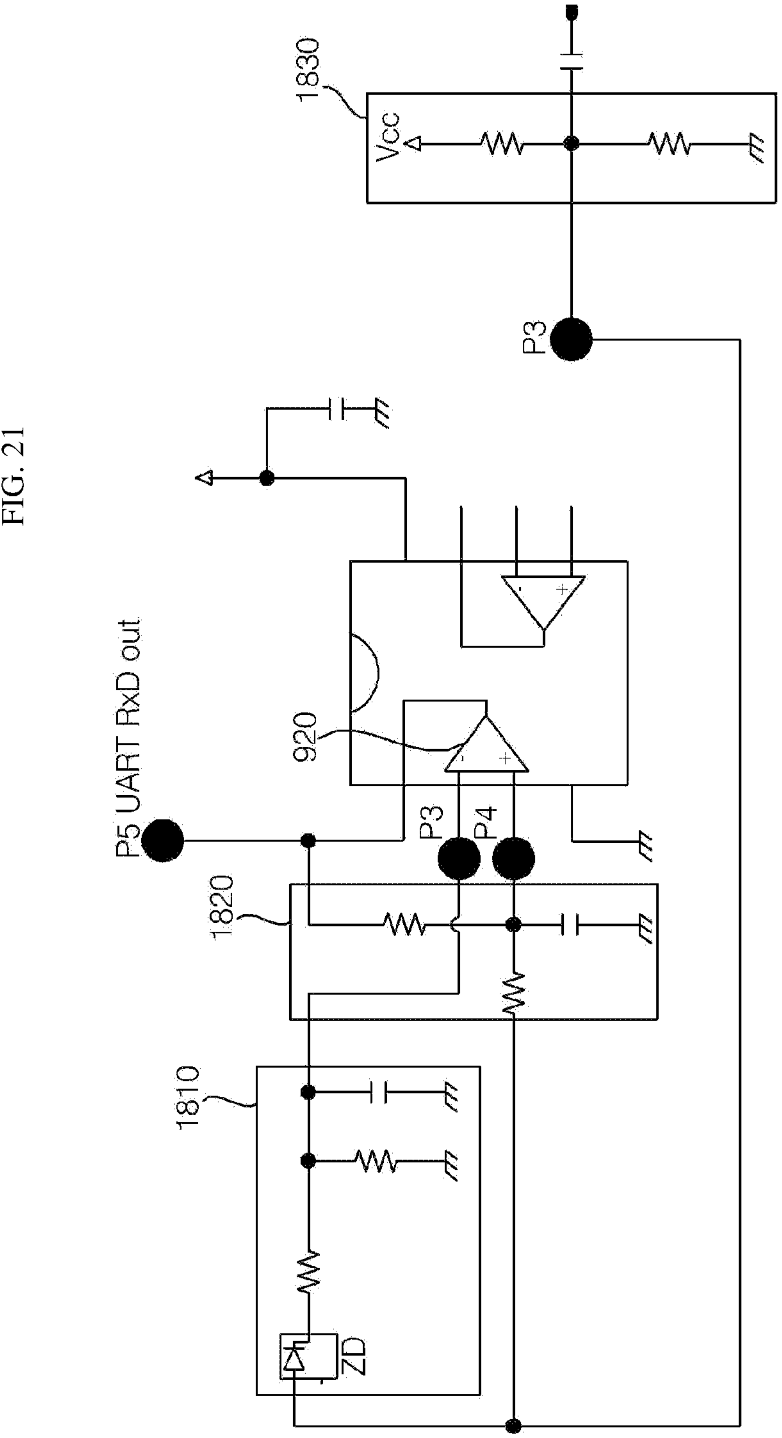
FIG. 21 is a diagram showing a reception unit circuit according to an embodiment of the present disclosure.
Figure 22:
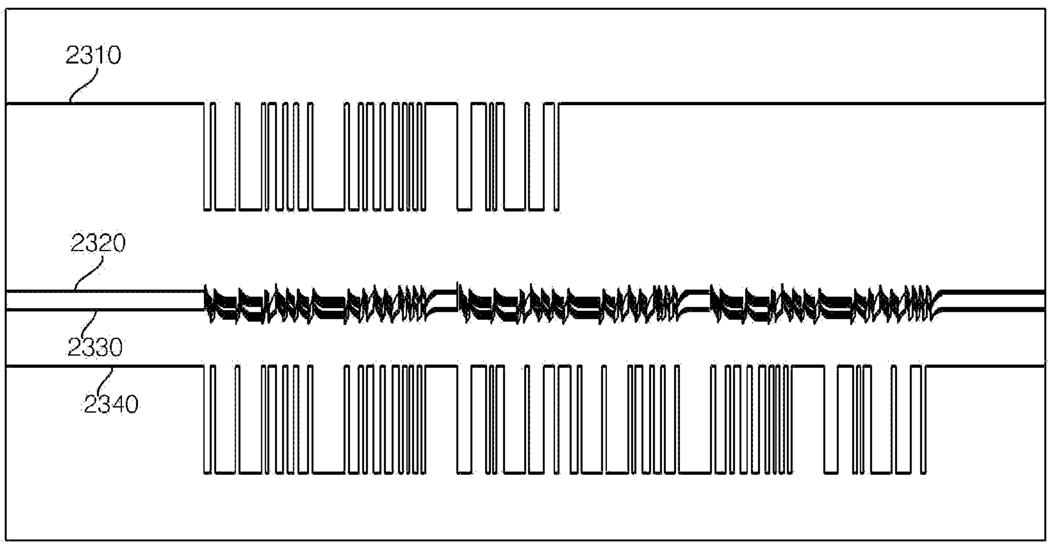
FIGS. 22 and 23 are diagrams showing signals output from the circuit of FIG. 21.
Figure 23:
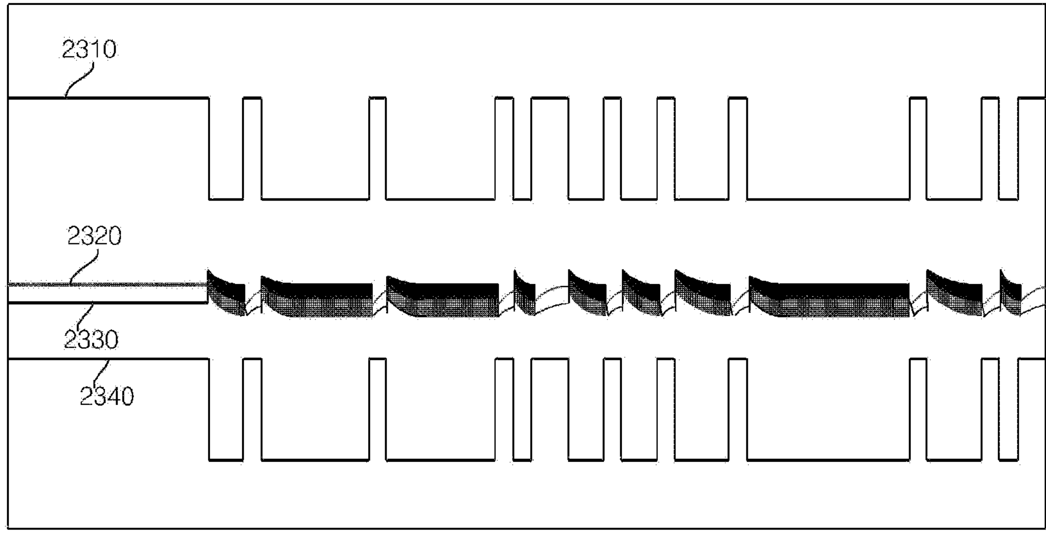

FIG. 21 is a diagram illustrating a reception unit circuit according to an embodiment of the present disclosure. FIGS. 22 and 23 are diagrams illustrating signals output from the circuit of FIG. 21, FIG. 22 shows signal waveforms measured at third to fifth positions P3 to P5 of FIG. 21, and FIG. 23 is an enlarged view of FIG. 22.

Referring to 21 to 23, the third position P3 is a negative (−) terminal of the OP-AMP 920, and an envelope detection signal 2330 detected by the envelope detection unit 1810 is input thereto.

The fourth position P4 is a positive (+) terminal of the OP-AMP 920, and an average ref signal 2320 smoothed by the RC filter 1820 is input thereto. The OP-AMP 920 compares the signals 2320 and 2330 input to the terminals and outputs an inverted signal.

Referring to FIGS. 21 to 23, it can be ascertained that the carrier frequency appears in the ASK modulated signals 2320 and 2330 only when UART transmission data (TxD) 2310 is low, and the ASK signal is normally demodulated into UART data through a signal 2340 measured at the fourth position P5.

Figure 24:
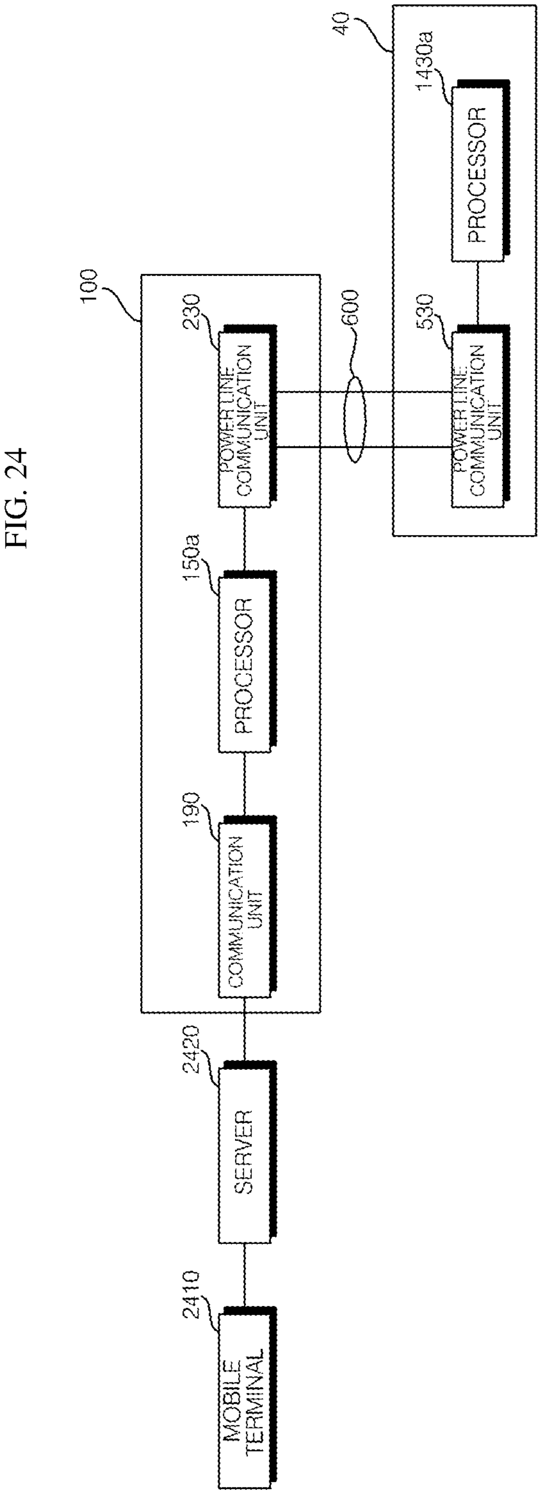
FIG. 24 is a diagram referenced in description of communication of a robot system according to an embodiment of the present disclosure.

FIG. 24 is a diagram referenced in description of communication of a robot system according to an embodiment of the present disclosure.

The robot system according to an embodiment of the present disclosure may include the mobile robot 100 that travels using power stored in the battery 210, and the docking station 40 that charges the battery 210 by supplying power through the charging cable 600.

The mobile robot 100 and the docking station 40 may include the power line communication units 230 and 530 that perform power line communication through the charging cable 600.

Accordingly, the mobile robot 100 and the docking station 40 can charge the battery of the mobile robot 100 and perform bidirectional data communication using the two-wire charging cable 600.

As described above, the power line communication units 230 and 530 may include the transmission unit 800 that includes the mixer 820 that mixes a serial communication signal with a carrier signal to generate an OOK modulated transmission signal and the capacitor 810 disposed between the mixer 820 and the charging cable 600, and the reception unit 900 that includes the operational amplifier 920, the RC filter 930 connected to the first terminal of the operational amplifier 920, an envelope detection unit 940 connected to the second terminal of the operational amplifier 920, and the capacitor 910 connected to the RC filter 930 and the envelope detection unit 940.

The mobile robot 100 may include the first processor 150*a* that processes power line communication data, and the docking station 20 may include the second processor 450*a* that processes power line communication data. The first and second processors 150*a* and 450*a* may generate data for power line communication, extract data from received signals, and determine the data.

The docking station 40 can perform bidirectional communication with the mobile robot 100, and can communicate with external devices via the mobile robot 100.

The mobile robot 100 can transmit at least one of status information, an update file, or a dust bin emptying request signal to the docking station 40 through power line communication.

The docking station 40 can transmit at least one of status information such as dust collection amount information of the dust collection chamber 420 or a response to a request received from the mobile robot 100 to the mobile robot 100 through power line communication.

According to an embodiment of the present disclosure, the docking station 40 can transmit various types of information such as dust bin emptying notification information to the mobile robot 100 through power line communication, and the mobile robot 100 can transmit various types of information such as dust bin emptying notification information to the predetermined server 2420 or the predetermined mobile terminal 2410.

According to an embodiment of the present disclosure, firmware can be updated without disassembling the docking station 40.

A user can request firmware update by operating the mobile terminal 2410. The server 2420 may transmit an update file through the communication unit 190 of the mobile robot 100 using a communication method such as Wi-Fi. The mobile robot 100 can transfer the update file to the docking station 40 through power line communication.

The docking station 40 can update the firmware using the received update file and notify the mobile robot 100 of completion of update through power line communication.

The mobile robot 100 may notify the server 2420 and/or the mobile terminal 2410 of completion of update through the communication unit 190.

The mobile robot, the docking station, and the robot system including the same according to the present disclosure are not limited to the configurations and methods of the embodiments described above, and all or some of the embodiments may be selectively combined such that various modifications can be made.

In addition, although preferred embodiments of the present disclosure have been illustrated and described above, the present disclosure is not limited to the specific embodiments described above and various modifications can be made by those skilled in the art without departing from the gist of the present disclosure as claimed in the claims. Such modifications should not be understood individually from the technical idea or perspective of the present disclosure.

The invention claimed is:

1. A mobile robot comprising:

a main body in which a battery is accommodated;

a traveling unit configured to move the main body to a station for charging the battery; and a power supply unit including a charging unit configured to receive power from the station through a charging cable to charge the battery, and a power line communication unit configured to perform power line communication with the station through the charging cable, wherein the power line communication unit comprises:

a mixer configured to mix a serial communication signal with a carrier signal to generate an on-off keying (OOK) modulated transmission signal; and a transmission unit including a capacitor disposed between the mixer and the charging cable, and wherein the mixer includes a three-state buffer, and the transmission signal generated by the mixer is output in a high impedance (High-Z) state when the serial communication signal is high, and the carrier signal is output only when the serial communication signal is low.

2. The mobile robot according to claim 1, further comprising a processor configured to generate the carrier signal and the serial communication signal and having a first terminal through which the carrier signal is output and a second terminal through which the serial communication signal is output, the first terminal and the second terminal being connected to the mixer.

3. The mobile robot according to claim 2, wherein the power line communication unit comprises:

an operational amplifier (OP-AMP) connected to a third terminal of the processor;

an RC filter connected to a first terminal of the operational amplifier;

an envelope detection unit connected to a second terminal of the operational amplifier; and a reception unit including a capacitor connected to the RC filter and the envelope detection unit.

4. The mobile robot according to claim 3, wherein the RC filter outputs a moving average value based on a received signal, the envelope detection unit detects an envelope in the received signal and outputs an envelope detection signal, and the operational amplifier compares the moving average value and the envelope detection signal and outputs an inverted signal.

5. The mobile robot according to claim 1, wherein the power line communication unit includes a reception unit configured to demodulate an on-off keying (OOF) modulated received signal.

6. The mobile robot according to claim 1, wherein the charging unit includes an LC filter disposed at the front of the battery.

7. A docking station comprising:

a charging terminal electrically connected to a terminal of a mobile robot;

a charging unit configured to supply power for charging a battery of the mobile robot through a charging cable; and a power line communication unit configured to perform power line communication with the mobile robot through the charging cable, wherein the power line communication unit comprises:

a mixer configured to mix a serial communication signal with a carrier signal to generate an on-off keying (OOK) modulated transmission signal; and a transmission unit including a capacitor disposed between the mixer and the charging cable, and wherein the mixer includes a three-state buffer, and the transmission signal generated by the mixer is output in a high impedance (High-Z) state when the serial communication signal is high, and the carrier signal is output only when the serial communication signal is low.

8. The docking station according to claim 7, further comprising:

a suction unit including a dust collection chamber for receiving dust and a suction motor for sucking dust in a dust bin of the mobile robot into the dust collection chamber; and a sensor unit including a sensor for detecting the amount of dust collected in the dust collection chamber, wherein the docking station transmits dust collection chamber emptying notification information to the mobile robot through the power line communication unit on the basis of data detected by the sensor.

9. The docking station according to claim 7, further comprising a processor configured to generate the carrier signal and the serial communication signal and having a first terminal through which the carrier signal is output and a second terminal through which the serial communication signal is output, the first terminal and the second terminal being connected to the mixer.

10. The docking station according to claim 9, wherein the power line communication unit comprises:

an operational amplifier (OP-AMP) connected to a third terminal of the processor;

an RC filter connected to a first terminal of the operational amplifier;

an envelope detection unit connected to a second terminal of the operational amplifier; and a reception unit including a capacitor connected to the RC filter and the envelope detection unit.

11. The docking station according to claim 10, wherein the operational amplifier compares a moving average value output from the RC filter with an envelope detection signal output from the envelope detection unit and outputs an inverted signal.

12. The docking station according to claim 7, wherein the power line communication unit includes a reception unit configured to demodulate an on-off keying (OOF) modulated received signal.

13. The docking station according to claim 7, further comprising a power transform unit configured to transform commercial power into charging power for the battery, wherein the charging unit includes an LC filter disposed between the charging cable and the power transform unit.

14. A robot system comprising:

a mobile robot configured to travel on the basis of power stored in a battery; and a docking station configured to supply power through a charging cable to charge the battery, wherein the mobile robot and the docking station each include a power line communication unit configured to perform power line communication through the charging cable, and wherein the power line communication unit of each of the mobile robot and the docking station includes a mixer having a three-state buffer, and is configured to generate an on-off keying (OOK) modulated transmission signal by outputting a carrier signal only when a serial communication signal is low and outputting a high impedance (High-Z) state when the serial communication signal is high.

15. The robot system according to claim 14, wherein the docking station transmits dust collection chamber emptying notification information to the mobile robot through power line communication, and the mobile robot transmits the dust collection chamber emptying notification information to a predetermined server or a predetermined mobile terminal.

16. The robot system according to claim 14, wherein the power line communication unit of each of the mobile robot and the docking station comprises:

a transmission unit including a mixer configured to mix a serial communication signal with a carrier signal to generate an on-off keying (OOK) modulated transmission signal, and a capacitor disposed between the mixer and the charging cable; and a reception unit including an operational amplifier (OP-AMP), an RC filter connected to a first terminal of the operational amplifier, an envelope detection unit connected to a second terminal of the operational amplifier, and a capacitor connected to the RC filter and the envelope detection unit.

* * * * *